United States Patent
Snyder

(10) Patent No.: US 12,025,057 B2
(45) Date of Patent: Jul. 2, 2024

(54) AIRCRAFT WITH THERMAL ENERGY STORAGE SYSTEM WITH BYPASS CONTROL

(71) Applicant: Rolls-Royce North American Technologies, Inc., Indianapolis, IN (US)

(72) Inventor: Douglas J. Snyder, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 16 days.

(21) Appl. No.: 17/715,590

(22) Filed: Apr. 7, 2022

(65) Prior Publication Data

US 2023/0323816 A1    Oct. 12, 2023

(51) Int. Cl.
| | |
|---|---|
| F02C 7/224 | (2006.01) |
| B64D 37/02 | (2006.01) |
| B64D 37/34 | (2006.01) |
| F28D 20/00 | (2006.01) |

(52) U.S. Cl.
CPC .............. *F02C 7/224* (2013.01); *B64D 37/02* (2013.01); *B64D 37/34* (2013.01); *F28D 20/0034* (2013.01)

(58) Field of Classification Search
CPC . B64D 33/10; B64D 37/34; F02C 7/12; F02C 7/22; F02C 7/224; F02C 9/26; F02C 9/28; F02K 7/10
See application file for complete search history.

(56) References Cited

U.S. PATENT DOCUMENTS

| | | | |
|---|---|---|---|
| 4,263,786 A * | 4/1981 | Eng ........................ | B64D 13/06 62/89 |
| 4,776,536 A | 10/1988 | Hudson et al. | |
| 6,948,331 B1 | 9/2005 | Ho | |
| 8,522,572 B2 | 9/2013 | Coffinberry et al. | |
| 9,561,857 B2 | 2/2017 | Weber | |
| 10,053,222 B2 | 8/2018 | Snyder | |
| 10,207,809 B2 | 2/2019 | Koerner et al. | |
| 10,215,097 B2 | 2/2019 | Miller et al. | |
| 10,384,792 B2 | 8/2019 | Snyder | |
| 11,273,925 B1 | 3/2022 | O'Meallie et al. | |
| 2010/0313591 A1 | 12/2010 | Lents et al. | |
| 2012/0000205 A1 * | 1/2012 | Coffinberry ............ | B64D 13/06 60/806 |
| 2021/0229827 A1 * | 7/2021 | Doman ..................... | F02C 7/14 |

FOREIGN PATENT DOCUMENTS

EP    2881328    6/2017

* cited by examiner

*Primary Examiner* — Scott J Walthour
(74) *Attorney, Agent, or Firm* — Barnes & Thornburg LLP

(57) ABSTRACT

A thermal energy system for use with an aircraft includes a cooling loop and a cooler. The cooling loop includes a fluid conduit and a pump configured to move fluid through the fluid conduit to transfer heat from a heat source to the fluid in the fluid conduit to cool the heat source. The cooler includes an air-stream heat exchanger located in a duct and is in thermal communication with the fluid conduit to transfer heat between the fluid in the cooling loop and the air passing through the duct.

20 Claims, 10 Drawing Sheets

AIRCRAFT WITH THERMAL ENERGY STORAGE SYSTEM WITH BYPASS CONTROL

FIELD OF THE DISCLOSURE

The present disclosure relates generally to aircraft, and more specifically to aircraft with thermal energy systems for cooling heat generating components of the aircraft.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Some aircraft may include a hybrid electric propulsion system that may use one or more electric machines, such as generators and motors, to provide power to the aircraft. To reject waste heat produced by the engine, aircraft oil/hydraulic heat loads, power electronics, and/or the electric machines, the aircraft may use a ram-air heat exchanger to reject waste heat to the surrounding air in the atmosphere. However, when the aircraft is grounded or taxiing, the air may be relatively warm relative to the components to be cooled. Moreover, there may be little to no ram air pressure to force the air through the ram-air heat exchanger when the aircraft is grounded or taxiing, limiting the waste heat rejection.

As a result, the ram air duct and heat exchanger may be relatively large to achieve the large mass flow rates to effectively transfer heat to the air in the atmosphere at low ram pressure conditions. Conversely, at cruise altitude, the air temperature is cooler and the ram air pressure difference across the ram-air heat exchanger may have increased due to higher flight speed, which would allow for a smaller ram-air heat exchanger to be used, but for the insufficient cooling rate while grounded and taxiing.

To enable a smaller ram-air heat exchanger when the aircraft is grounded or taxiing, the aircraft may include a blower to draw air through the ram-air heat exchanger, adding weight to the aircraft. As a result, providing a thermal energy system that enables a ram-air heat exchanger configured to maximize fuel efficiency and decrease the added weight to the aircraft presents design challenges.

SUMMARY

The present disclosure may comprise one or more of the following features and combinations thereof.

A thermal energy system for use with an aircraft may include a first heat source, a cooling loop, a cooler, a thermal-storage fuel system, and a bypass valve. The cooling loop may have a fluid conduit, an accumulator in fluid communication with the fluid conduit, and a pump configured to move fluid from the accumulator through the fluid conduit to transfer heat from the first heat source to the fluid to cool the first heat source. The cooler may include a duct configured to conduct air through the duct and an air-stream heat exchanger located in the duct and in thermal communication with the fluid in the cooling loop to transfer heat between the cooling loop and the air conducted through the duct.

In some embodiments, the thermal-storage fuel system may include a first fuel tank and a fuel-tank heat exchanger in thermal communication with the fluid. The first fuel tank may be configured to store fuel therein. The fuel-tank heat exchanger may be configured to transfer heat between the fluid in the cooling loop and fuel stored in the first fuel tank.

In some embodiments, the bypass valve may be connected to the fluid conduit upstream of the air-stream heat exchanger. The bypass valve may be configured to selectively cause at least a portion of a flow of fluid in the cooling loop to bypass the fuel-tank heat exchanger and be delivered upstream of the accumulator.

In some embodiments, the thermal-storage fuel system may further include a second fuel tank in fluid communication with the first fuel tank and the second fuel tank. The second fuel tank may be configured to store fuel at a temperature that is different from a temperature of the fuel in the first fuel tank.

In some embodiments, the thermal-storage fuel system may further include an engine-fuel unit. The engine-fuel unit may be configured to receive fuel from the second fuel tank and deliver the fuel to an engine.

In some embodiments, the engine-fuel unit may include a valve system in fluid communication with the second fuel tank and an engine-fuel heat exchanger. The engine-fuel heat exchanger may be in thermal communication with the valve system and the cooling loop to transfer heat between the fluid in the cooling loop and the fuel from the second fuel tank. The valve system may be configured vary a flow of fuel through the engine-fuel heat exchanger to deliver fuel to the engine at an engine-fuel unit predetermined threshold temperature.

In some embodiments, the bypass valve may be connected to the fluid conduit upstream of the engine-fuel unit. The bypass valve may be configured to selectively cause at least a portion of a flow of fluid in the cooling loop to bypass the engine-fuel heat exchanger.

In some embodiments, the thermal energy storage device may further comprise a second heat source. The second heat source may be configured to operate at a lower temperature than the first heat source during use of the thermal energy system.

In some embodiments, the cooling loop may further include a compressor and a first expansion valve. The compressor may be located downstream of the second heat source. The first expansion valve may be located upstream of the second heat source. The bypass valve may be connected to the fluid conduit downstream of the compressor.

In some embodiments, the thermal energy storage device may comprise a control system. The control system may be configured to selectively vary a flow of the fluid in the cooling loop through the air-stream heat exchanger and the fuel-tank heat exchanger to maintain a temperature of the first heat source below a predetermined heat load temperature.

In some embodiments, the control system may include a sensor. The sensor may be connected to the fluid conduit upstream of the accumulator. The sensor may be configured to measure a temperature of the fluid in the cooling loop as the fluid flows to the accumulator. The control system may be configured to compare the temperature measured by the sensor to a sensor target temperature. The control system may be configured to direct the bypass valve to selectively vary at least a portion of the flow of fluid in the cooling loop to bypass the air-stream heat exchanger and the fuel-tank heat exchanger and enter the flow of fluid in the cooling loop upstream of the sensor in response to the temperature measured being different from the sensor target temperature.

In some embodiments, the thermal energy storage device may further comprise a control system. The control system may be configured to selectively vary a flow of the fluid in the cooling loop through the air-stream heat exchanger and the fuel-tank heat exchanger to maintain a temperature of the first heat source below a predetermined heat load temperature. In some embodiments, control system may be configured to vary the predetermined heat load temperature throughout a flight cycle of the aircraft.

In some embodiments, the control system may be configured to allow the flow of fluid in the cooling loop through the fuel-tank heat exchanger if a temperature of the fluid in the cooling loop is above the temperature of the fuel in the first fuel tank and the temperature of the fuel in the first fuel tank is less than a first fuel tank predetermined threshold temperature. In some embodiments, the control system may be configured to allow the flow of fluid in the cooling loop through the fuel-tank heat exchanger if the temperature of the fluid in the cooling loop is below the temperature of the fuel in the first fuel tank and the temperature of the fuel in the first fuel tank is greater than the first fuel tank predetermined threshold temperature.

In some embodiments, the control system may be configured to measure the heat transfer between the fluid and the fuel in the first fuel tank. The control system may be configured to compare the heat transfer measured to a predetermined heat rejection schedule. The control system may be configured to selectively vary the flow of fluid in the cooling loop through the fuel-tank heat exchanger in response to the heat transfer measured being different from the predetermined heat rejection schedule.

In some embodiments, the thermal energy storage system may further comprise a second heat source. The second heat source may be configured to operate at a lower temperature than the first heat source during use of the thermal energy system. The cooling loop may further include a compressor located downstream of the second heat source and a first expansion valve located upstream of the second heat source. The bypass valve may be connected to the fluid conduit downstream of the compressor.

In some embodiments, the thermal energy storage system may further comprise a control system. The control system may be configured to selectively vary a flow of the fluid in the cooling loop through the air-stream heat exchanger and the fuel-tank heat exchanger to maintain a temperature of the first and second heat sources below a predetermined heat load temperature.

In some embodiments, the control system may include a sensor. The sensor may be connected to the fluid conduit upstream of the accumulator. The sensor may be configured to measure a temperature of the fluid in the cooling loop as the fluid flows to the accumulator.

In some embodiments, the thermal energy storage system may further include a control system including a sensor connected to the fluid conduit upstream of the accumulator. The sensor may be configured to measure a temperature of the fluid in the cooling loop. The control system may be configured to compare the temperature measured by the sensor to a sensor target temperature. The control system may be configured to direct the bypass valve to selectively vary at least a portion of the flow of fluid in the cooling loop to bypass the fuel-tank heat exchanger in response to the temperature measured being different from the sensor target temperature.

According to another aspect of the present disclosure, a method may include providing a thermal energy system for use with an aircraft including a cooling loop, a cooler, a thermal-storage fuel system, and a bypass valve. The cooling loop may have a fluid conduit, an accumulator in fluid communication with the fluid conduit, and a pump configured to move fluid from the accumulator through the fluid conduit. The cooler may include a duct configured to conduct air through the duct and an air-stream heat exchanger located in the duct and in thermal communication with the fluid in the cooling loop to transfer heat between the cooling loop and the air conducted through the duct. The thermal-storage fuel system may include a first fuel tank configured to store fuel therein and a fuel-tank heat exchanger in thermal communication with the fluid in the cooling loop. The bypass valve may be connected to the fluid conduit upstream of the air-stream heat exchanger.

In some embodiments, the method may further include conducting the fluid through the cooling loop to transfer heat between a first heat source and the fluid in the cooling loop, conducting the fluid in the cooling loop to the air-stream heat exchanger to transfer heat between the fluid in the cooling loop and the air passing through the duct, and conducting the fluid in the cooling loop to the fuel-tank heat exchanger to transfer heat between the fluid in the cooling loop and fuel stored in the first fuel tank. In some embodiments, the method may further include directing the bypass valve to selectively vary at least a portion of a flow of fluid in the cooling loop to bypass the air-stream heat exchanger and the fuel-tank heat exchanger and be delivered to upstream of the accumulator.

In some embodiments, the method may further include selectively varying a flow of the fluid in the cooling loop through the air-stream heat exchanger to maintain a temperature of the first heat source below a predetermined heat load temperature. In some embodiments, the method may further include selectively varying a flow of the fluid through the fuel-tank heat exchanger to maintain the temperature of the first heat source below the predetermined heat load temperature.

In some embodiments, the method may further include measuring the heat transfer between the fluid and the fuel in the first fuel tank, comparing the heat transfer measured to a predetermined heat rejection schedule, and selectively varying the flow of fluid in the cooling loop through the fuel-tank heat exchanger in response to the heat transferred measured being different from the predetermined heat rejection schedule. In some embodiments, the method may further include measuring the temperature of the fluid in the cooling loop upstream of the accumulator included in the cooling loop, comparing the temperature measured to a sensor target temperature, and selectively varying the flow of fluid in the cooling loop through the air-stream heat exchanger and the fuel-tank heat exchanger in response to the temperature measured being different from the sensor target temperature.

In some embodiments, the method may further include conducting the fluid through the cooling loop to transfer heat between a second heat source and the fluid in the cooling loop. The second heat source may be configured to operate at a lower temperature than the first heat source during use of the thermal energy system. The cooling loop may further include a compressor located downstream of the second heat source and a first expansion valve located upstream of the second heat source. The bypass valve may be connected to the fluid conduit downstream of the compressor.

These and other features of the present disclosure will become more apparent from the following description of the illustrative embodiments.

DETAILED DESCRIPTION OF THE DRAWINGS

Figure 1:
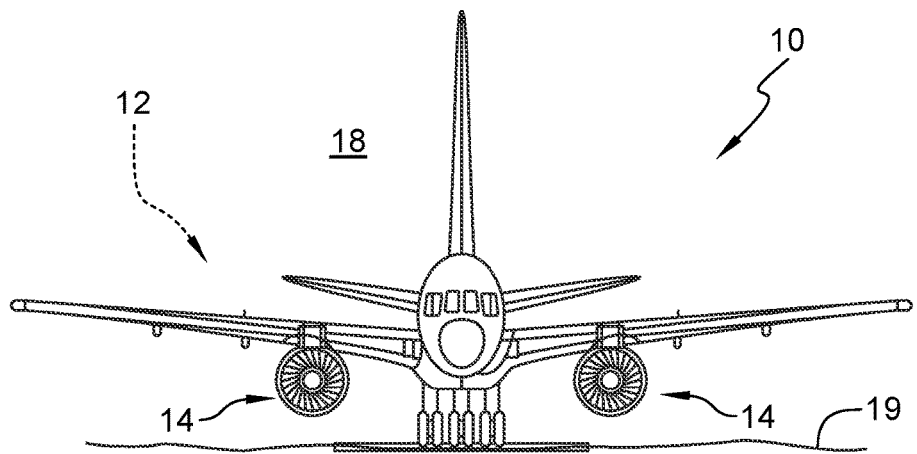
FIG. 1 is elevation view of an aircraft that includes a gas turbine engine and a thermal energy system connected with the gas turbine engine to manage the temperatures of the electric components of the aircraft and the gas turbine engine.

For the purposes of promoting an understanding of the principles of the disclosure, reference will now be made to a number of illustrative embodiments illustrated in the drawings and specific language will be used to describe the same.

A thermal energy system 12 according to the present disclosure is adapted for use with an aircraft 10 such as the aircraft 10 shown in FIG. 1. The thermal energy system 12 is configured to manage temperatures of components of the aircraft 10, such as components of a gas turbine engine 14, electric batteries, motor-generators, and/or oil/hydraulic heat loads 16 of the aircraft 10.

Figure 2:
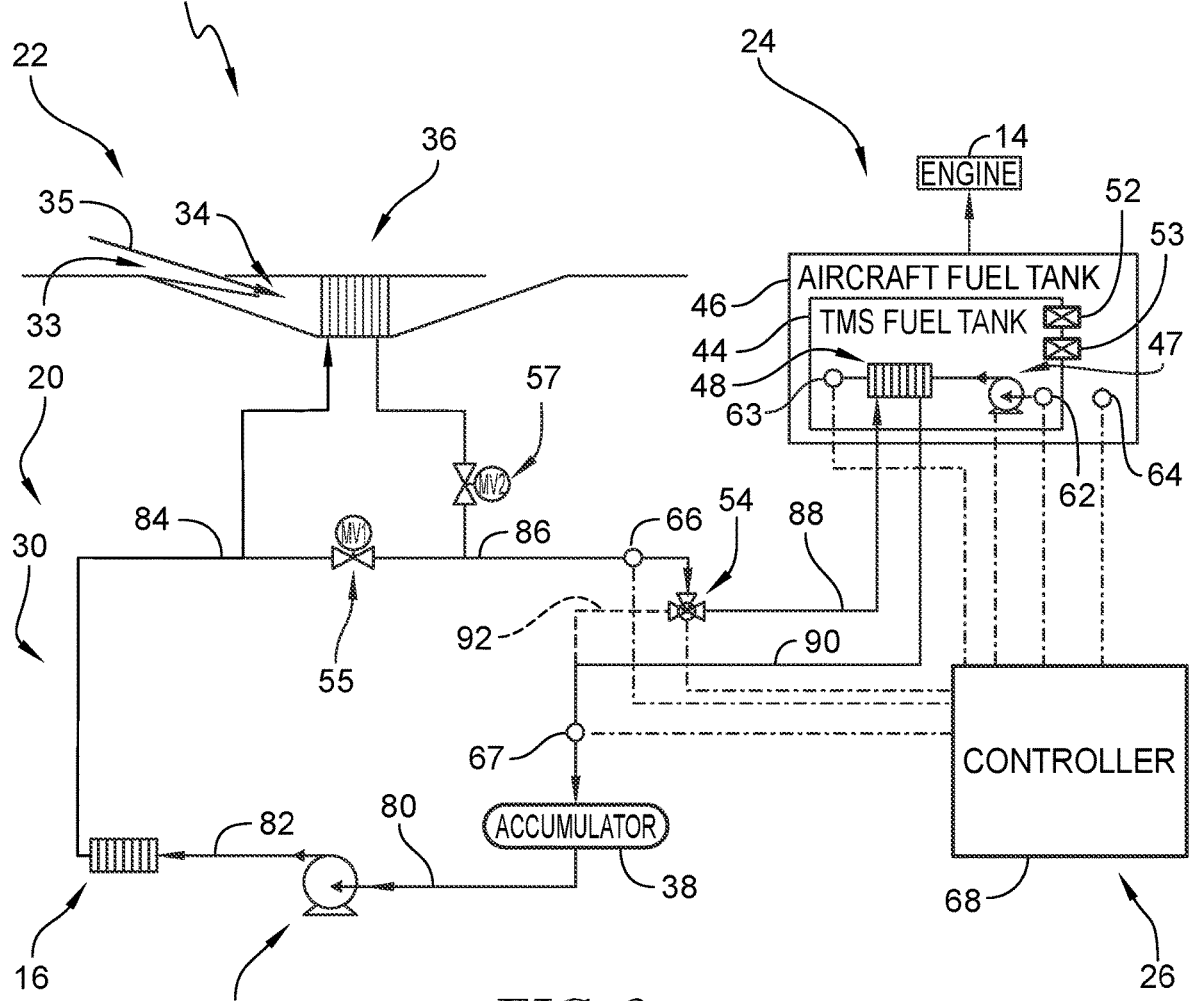
FIG. 2 is a diagrammatic view of the thermal energy system included in the aircraft of FIG. 1 showing the thermal energy system includes a cooling loop configured to move fluid through system to transfer heat from a heat source to the fluid in the fluid conduit to cool the heat source, a ram air cooler configured to transfer heat between the fluid in the cooling loop to air passing through the ram air cooler, a thermal-storage fuel system configured to transfer heat between the fluid in the cooling loop and fuel stored in a first fuel tank.
Figure 3:
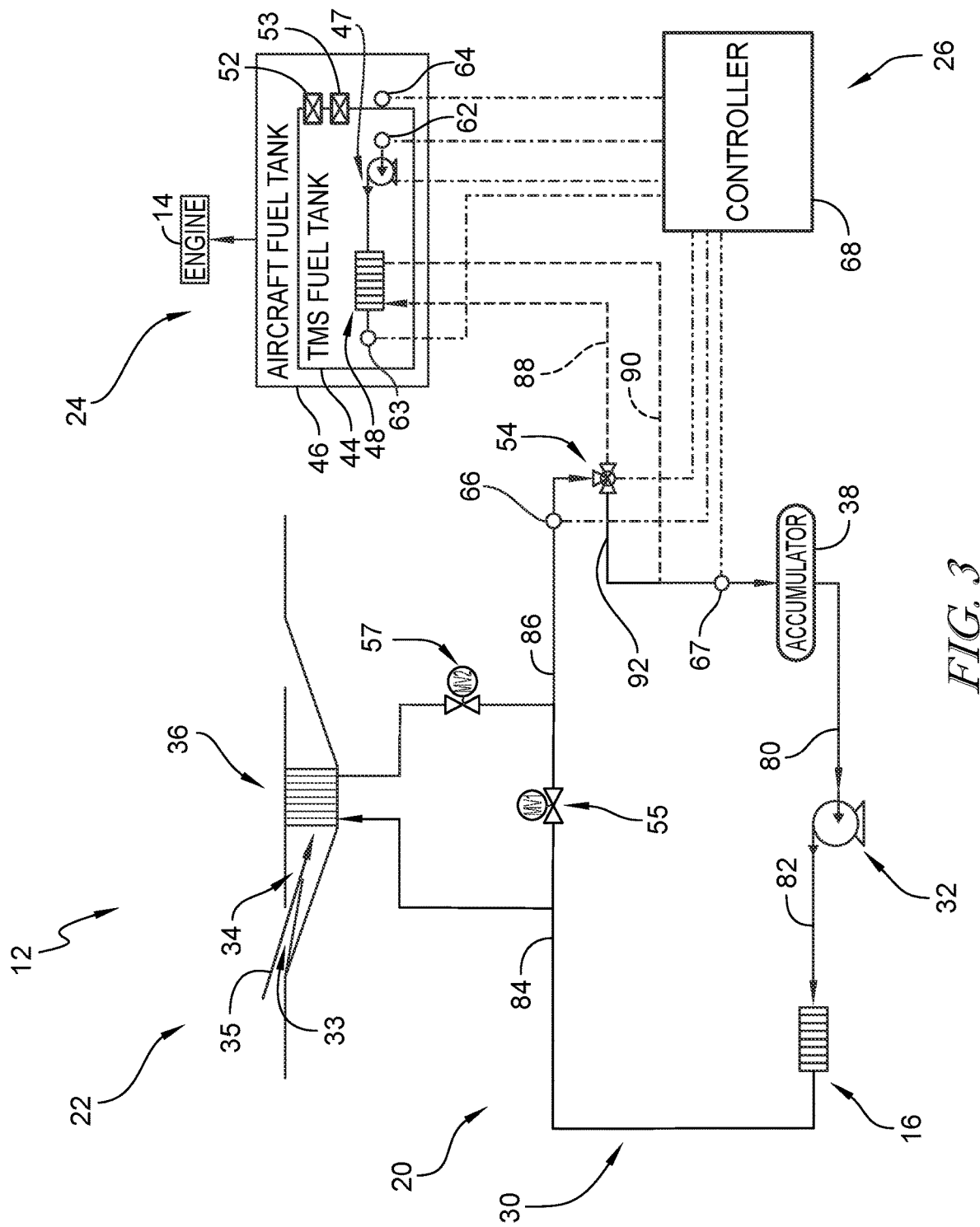
FIG. 3 is a diagrammatic view similar to FIG. 2 showing the thermal energy system further includes a controller coupled to a valve connected to the fluid conduit in the cooling loop to selectively cause the flow of fluid to bypass the fuel-tank heat exchanger.

The thermal energy system 12 includes a cooling loop 20, a cooler 22, and a thermal-storage fuel system 24 as shown in FIGS. 2 and 3. The cooling loop 20 has a fluid conduit 30 and a pump 32 configured to move fluid through the fluid conduit 30 to transfer heat from a heat source 16 to the fluid thereby cooling the heat source 16. The cooler 22 includes a duct 34 configured to conduct air therethrough and a heat exchanger 36 located in the duct 34. The air-stream heat exchanger 36 is in thermal communication with the fluid in the cooling loop 20 to transfer heat between the cooling loop 20 and the air conducted through the duct 34. The thermal-storage fuel system 24 is configured to transfer heat between the fluid in the cooling loop 20 and fuel stored in the thermal-storage fuel system 24. As such, one or both of the cooler 22 and the thermal-storage fuel system 24 may transfer heat with the fluid.

The thermal-storage fuel system 24 includes a first fuel tank 44, a second fuel tank 46, and a fuel-tank heat exchanger 48 as shown in FIGS. 2 and 3. Both the first fuel tank 44 and second fuel tank 46 are configured to store fuel therein. The second fuel tank 46 is in fluid communication with the first fuel tank 44 through the valves 52, 53 to transfer fuel selectively therebetween. The fuel-tank heat exchanger 48 is in thermal communication with the fluid conduit 30 and is configured to transfer heat between the fluid in the cooling loop 20 and fuel stored in the first fuel tank 44. In the illustrative embodiment, the thermal-storage fuel system 24 includes a fuel pump 47 configured to pump fuel through the fuel-tank heat exchanger 48.

In some embodiments, the cooler 22 may be a ram air cooler 22 and the duct 34 is configured to receive air from the atmosphere 18 around the aircraft 10 during forward movement of the aircraft 10 relative to the ground 19 and a ram-air heat exchanger 36 located in the duct 34. The duct 34 may be free of any air movers (i.e. blades, fans, blowers, etc.). Aircraft may often use ram air to cool heat loads of the aircraft. Such thermal energy systems rely on ram-air heat exchangers to reject the waste heat produced by power electronic devices or electric machines such as generators, motors, and/or engines. However, the temperature difference between the component being cooled and the temperature of the air flowing through the ram-air heat exchanger may cause design challenges.

For example, when the aircraft 10 is stationary or taxiing, little or no ram pressure is created to force air through the ram-air heat exchanger 36. As a result, there is little or no air to cool the coolant in the cooling loop 20. Therefore, some typical aircraft may include a blower to force air through the ram-air heat exchanger, which may add additional weight and volume to the system. The system of the present disclosure does not include or use a blower.

The thermal energy system 12 of the present disclosure includes the thermal-storage fuel system 24 to eliminate the blower and reduce a size of the duct 34 and heat exchanger compared to typical systems thereby increasing efficiency of the thermal energy system 12 and reducing size and weight of the aircraft. The thermal-storage fuel system 24 uses the on-board fuel in the first fuel tank 44 as a heat sink for the heat loads 16 produced early in the flight cycle. In the illustrative embodiment, the cooling loop 20 is structured to conduct the fluid heated from the heat source 16 through the air-stream heat exchanger 36 followed by the fuel-tank heat exchanger 48 after the air-stream heat exchanger 36.

In this way, the fuel in the first and second fuel tanks 44, 46 is not transported to the heat loads 16, but rather, the fluid is brought to the fuel to transfer the heat with the fuel. Transferring heat with the fuel in the first fuel tank 44 minimizes safety risks, and heating the fuel prior to burning in the engine 14 may provide additional benefits.

In the illustrative embodiment, the thermal energy system 12 further includes a control system 26 as shown in FIGS. 2 and 3. The control system 26 is configured to manage the temperature of the heat load 16 so that the heat load 16 does not exceed threshold temperatures, i.e. a predetermined heat load temperature. In some embodiments, the heat load 16 may comprise of multiple heat loads 16 that may be arranged in series, parallel, or a combination. The control system 26 is also configured to manage the flow of fluid in the cooling loop 20 so that cooling of the heat load 16 is provided in the most efficient way. In other words, the control system 26 is configured to manage the flow of fluid so as to minimize the fuel burned to complete the flight cycle. The thermal-storage fuel system 24 adds the capability to reduce the amount of heat rejected to the environment and to determine the most efficient time to reject the heat to the environment.

The control system 26 includes valves 52, 53, 54, 55, 57, sensors 62, 63, 64, 66, 67, and a controller 68 as shown in FIGS. 2 and 3. The valves 52, 53 are configured to transfer fuel between the fuel tanks 44, 46 to cool the fuel in the first fuel tank 44 or heat the fuel in the second fuel tank 46. The valve 54 is connected to the fluid conduit 30 downstream of the air-stream heat exchanger 36 and configured to selectively cause a flow of fluid to bypass the fuel-tank heat exchanger 48. The valves 55, 57 are configured to vary the flow rate of the fluid in the cooling loop 20 through the air-stream heat exchanger 36. The sensor 62 is configured to measure the temperature of the fuel at the inlet of the fuel pump 47, while the sensor 63 is configured to measure the temperature of the fuel at the outlet of the fuel pump 47. The sensor 64 is configured to measure the temperature of the fluid in the fuel tank 46. The sensor 66 is configured to measure the temperature of the fluid in the cooling loop 20 directly upstream of the fuel-tank heat exchanger 48 as it enters the fuel-tank heat exchanger 48. The sensor 67 is configured to measure the temperature of the fluid in the cooling loop 20 as it returns to an accumulator 38 included in the cooling loop 20. In some embodiments, where the cooling loop 20 is a two-phase flow system, the sensor 67 may be a pressure gauge.

The controller 68 is configured to manage the cooling of the heat loads 16 as well as the use of the thermal-storage fuel system 24. The controller 68 is configured to direct the valves 54, 55, 57 to vary the flow of the fluid in the cooling loop 20. The controller 68 is also configured to control the fuel pump flow rate by the fuel pump 47 included in the thermal-storage fuel system 24 through the fuel-tank heat exchanger 48. The controller 68 controls the valves 54, 55, 57 and the fuel pump 47 so as to maintain the fluid in the cooling loop 20 at a predetermined temperature.

The controller 68 is configured to maximize the fuel savings of the aircraft 10 based on several factors, such as the type of day (hot or cold), the temperature along the flight path. In the illustrative embodiment, the controller 68 is configured to gather the state of the thermal energy system 12 prior to the flight as well as expected conditions along the flight path. Before take-off, the controller 68 is configured to assess the amount of fuel on board the aircraft 10 in each of the first fuel tank 44 and the second fuel tank 46, as well as temperature of each tank 44, 46. This establishes the initial heat sink capacity on board the aircraft 10.

Additionally, the controller 68 is configured to analyze the anticipated flight path, including speed, altitude, air conditions (temperature, wind speed) to determine the anticipated change in weight of the fuel over the flight profile and the expected temperature of the air heat sink. The controller 68 is configured to use flight path conditions to determine when heat should be added to the first fuel tank 44 and when it would be best to remove heat from the first fuel tank 44 to minimize fuel burn.

The control system 26 may be configured with model-based controls that run simulations prior to the flight. These simulations may be achieved through the use of artificial intelligence, general rules, or physics based calculations. The control system 26 may be configured to generate a schedule of heat to be rejected to the first fuel tank 44 as a function of location in the flight path.

In some embodiments, the controller 68 is configured to transfer as much heat into the fuel as possible, while not exceeding any system thermal limits. In this way, a greater percentage of the waste heat to be removed may be returned to the engine cycle to produce useful work. Therefore, on a cold day, the amount of heat transferred to the first fuel tank 44 may be much larger than on a hot day.

In addition, the controller 68 may be configured to minimize drag forces on the aircraft 10. With a variable air stream 35 passing through the air-stream heat exchanger 36, the cooling in the air-stream heat exchanger 36 may be timed to minimize fuel burn over the mission.

Using this information, a pre-flight fuel tank heat rejection schedule may be generated to control the flow of fluid in the cooling loop 20 to the thermal-storage fuel system 24. The schedule also includes re-cooling of the fuel tanks 44, 46 in preparation for being able to burn the fuel stored in the first fuel tank 44 and to also provide cooling during descent and taxiing after landing. This could require significant cooling of the fuel tanks 44, 46 while still at altitude.

In addition, the control system 26 may be configured to mix fuel between the first and second fuel tanks 44, 46 to maximize the use of the fuel thermal storage. Additionally, the pre-flight schedules may be updated during the flight.

Once the pre-flight schedules are established, the aircraft 10 may take-off. As the flight proceeds, the temperature of the fuel in the first fuel tank 44 is measured by the sensors 62, 63. The upstream sensor 62 measures the temperature of the fuel flowing through the fuel pump 47 and the downstream sensor 63 measures the temperature of the fuel exiting the fuel-tank heat exchanger 48. The controller 68 is configured to determine the temperature rise on the fuel stream going through the fuel-tank heat exchanger 48 based on the temperature measurements by the sensors 62, 63. The controller 68 is also configured to measure or calculate the fuel flow rate based on operating conditions of the fuel pump 47.

In this way, the controller 68 measures the actual heat rejection or heat absorption between the fluid and the fuel in the first fuel tank 44. The control system 26 is configured to match the actual heat transfer between the fluid and the fuel in the first fuel tank 44 with the heat rejection schedule.

To match the actual heat transfer between the fluid and the fuel in the first fuel tank 44, the controller 68 may direct the valves 55, 57 to vary the flow of fluid through the air-stream heat exchanger 36. The controller 68 may also direct the valve 54 to vary the flow of fluid through the fuel-tank heat exchanger 48. Alternatively, the controller 68 may be configured to vary the fuel flow rate through the fuel-tank heat exchanger 48 by changing fuel pump speed of the fuel pump 47.

In some embodiments, the full heat load 16 may not be able to be rejected to the fuel in the first fuel tank 44. In that case, the remaining heat load 16 may be rejected through the air-stream heat exchanger 36.

The amount of heat to be rejected through the air-stream heat exchanger 36 may be set to satisfy the temperature requirement measured by sensors 66, 67. The amount of heat to be rejected through the air-stream heat exchanger 36 may also be driven by the temperature of the fuel in the first fuel tank 44. If the fuel in the first fuel tank 44 is approaching thermal limits of the first fuel tank 44, the flow of cooling fluid to the first fuel tank 44 may be used to cool the fuel in the first tank 44.

In some embodiments, the temperature of the fuel in the first fuel tank 44 may drive the exit temperature from the air-stream heat exchanger 36 measured by the sensor 66. In such embodiments in which heat is to be absorbed from the fuel in the first fuel tank 44, the temperature measured by the sensor 66 should be lower than the temperature in the first fuel tank 44 and may be controlled to a target temperature to achieve the desired heat absorption from the first fuel tank 44.

In some embodiments, the controller 68 is configured to vary the amount of air flowing through the air-stream heat exchanger 36 in the duct 34. Reducing the airflow rate may also reduce the drag on the aircraft 10.

In some embodiments, the controller 68 is configured to direct the modulating valves 55, 57 to vary the coolant flow rate through the air-stream heat exchanger 36. In other embodiments, one of the modulating valves 55 may be replaced with a fixed flow restriction. The sensor 66 and/or the sensor 67 is configured to measure the temperature of the fluid to enable the controller 68 to better manage the heat rejection from the air-stream heat exchanger 36.

In some embodiments, the controller 68 is configured to control the flow of the fluid in the cooling loop 20 through the fuel-tank heat exchanger 48 based on a temperature measured by the sensor 62. The controller 68 may direct the valve 54 to allow the fluid in the cooling loop 20 through the fuel-tank heat exchanger 48 in response to the temperature of the fuel in the first fuel tank 44 being below a first fuel tank predetermined threshold temperature. The controller 68 may direct the valve 54 to fully, or partially block the fluid in the cooling loop 20 through the fuel-tank heat exchanger 48 in response to the temperature of the fuel in the first fuel tank 44 being above the first fuel tank predetermined threshold temperature.

In some embodiments, the first fuel tank predetermined threshold temperature may be the maximum allowable tank temperature of the first fuel tank 44. In some embodiments, the first fuel tank predetermined threshold temperature may be the maximum allowable fuel temperature at which the fuel can be safely supplied to the engine 14. In some embodiments, the first fuel tank predetermined threshold temperature may be changed throughout the flight mission.

In typical fuel systems, as fuel is passed to the engine 14, the aircraft 10 may add heat to the fuel. The engine 14 may further heat the fuel before it is burned in the combustor. Often, the engine 14 may have a maximum allowable fuel temperature at which the fuel may be supplied to the engine 14 that is far lower than the maximum temperature that the fuel will be when it is burned. This temperature limit may be used to ensure the fuel entering the engine 14 is cold enough to cool engine heat loads before burned in the combustor.

In some embodiments, the first fuel tank 44 may configured to allow the fuel in the first fuel tank 44 to be heated to the maximum temperature of the fluid in the cooling loop 20. In other embodiments, the first fuel tank 44 may be configured to allow the fuel in the first fuel tank 44 to be heated to some other temperature limit that is above the maximum allowable fuel temperature that may be delivered to the engine. The second fuel tank 46 stores fuel for the engine 14 at a temperature equal to or less than the maximum allowable fuel temperature that may be delivered to the engine 14. The second fuel tank is therefore configured to provide the fuel at the maximum allowable fuel temperature of the engine 14.

If the temperature of the fuel in the first fuel tank 44 is approaching the first fuel tank predetermined threshold temperature, one of the valves 52, 53 may allow some fuel to transfer between the fuel tanks 44, 46 to cool the fuel in the first fuel tank 44 or heat the fuel in the second fuel tank 46. As such, the controller 68 may determine if the valve 52 may transfer fuel between the fuel tanks 44, 46 based at least partially on the temperature measured by the sensors 62, 63, 64.

The valves 52, 53 provide fluid communication between the first and second fuel tanks 44, 46. In some embodiments, the first fuel tank 44 may have an inlet valve 53 and outlet valve 52 that are fluidly connected to the second fuel tank 46. The hot fuel in the first fuel tank 44 exits the first fuel tank 44 through the outlet 52 to the second fuel tank 46, while the relatively cooler fuel enters the first fuel tank 44 through the inlet 53 from the second fuel tank 46. The exchanger of the fuel between the first and second fuel tanks 44, 46 may be assisted with the fuel pump 47 through various piping arrangements and valves.

The thermal-storage fuel system 24 may further include another pump in fluid communication between the tanks 44, 46. The second pump may be configured to move the fuel between the tanks 44, 46.

In other embodiments, the system 12 may include a single fuel tank. The single fuel tank may be coupled to engine 14 to deliver the fuel to the engine 14. In such embodiments, the first fuel tank predetermined threshold temperature is a single fuel tank predetermined threshold temperature. In such embodiments, the single fuel tank predetermined threshold temperature is the maximum allowable fuel temperature at which the fuel can be safely passed to the engine 14.

In some embodiments, the controller 68 may also be configured to control the flow of the fluid in the cooling loop 20 through the fuel-tank heat exchanger 48 based on the temperature measured by the sensors 62, 63, 66, 67. The controller 68 may be configured to direct the valve 54 to control the fluid in the cooling loop 20 through the fuel-tank heat exchanger 48 in response to a temperature measured by at least one of the sensors 62, 63, 66, 67.

If the temperature of the fluid directly upstream of the fuel-tank heat exchanger 48 measured by the sensor 66 is below the first fuel tank predetermined threshold temperature, while the temperature of the fuel in the first fuel tank 44 is equal to or exceeds the first fuel tank predetermined threshold temperature, the controller 68 may allow the flow of fluid to the fuel-tank heat exchanger 48. Conversely, if the temperature of the fluid directly upstream of the fuel-tank heat exchanger 48 is above the first fuel tank predetermined threshold temperature, while the temperature of the fuel in the first fuel tank 44 is equal to or exceeds the first fuel tank predetermined threshold temperature, the controller 68 may fully, or partially block the flow of fluid to the fuel-tank heat exchanger 48.

In other embodiments, if the temperature of the fluid returning to the accumulator 38 measured by the sensor 67 is below a sensor target temperature, and the first fuel tank temperature is greater than the sensor target temperature, the controller 68 may direct the valve 54 to allow the flow of fluid to the fuel-tank heat exchanger 48. Conversely, if the temperature measured by the sensor 67 is above the sensor target temperature, the controller 68 may direct the valve 54 to fully, or partially block the flow of fluid to the fuel-tank heat exchanger 48.

During use of the thermal energy system 12 in the aircraft 10, the fluid in the fluid conduit 30 is pumped from the accumulator 38 to the heat source 16 as indicted by arrow 80. The pump 32 moves the fluid through the fluid conduit 30 to transfer heat from the heat source 16 to the fluid to cool the heat source 16 as indicted by arrow 82. Moving from the heat source 16, the flow of fluid in the fluid conduit 30 moves through the air-stream heat exchanger 36 to transfer heat between the fluid in the cooling loop 20 and the air passing through the duct 34 of the cooler 22 as indicated by arrow 84. The modulating valves 55, 57 are configured to vary the flow of fluid through the air-stream heat exchanger 36 based at least in part on the temperature measured by the sensor 62, 63, 64, 66, 67.

As the fluid in the fluid conduit 30 exits the air-stream heat exchanger 36 as indicated by arrow 86, the valve 54 controls the flow of fluid to the thermal-storage fuel system 24. The valve 54 is connected to the fluid conduit 30 downstream of the air-stream heat exchanger 36 to selectively cause the flow of fluid to fully, or partially bypass the fuel-tank heat exchanger 48 based at least in part on the temperature measured by the sensors 62, 63, 64, 66, 67.

The controller 68 may be configured to direct the valve 54 to allow the flow of the fluid in the fluid conduit 30 through the fuel-tank heat exchanger 48 based on the temperature measured by one or all of the sensors 62, 63, 64 as shown in FIG. 2. The valve 54 allows the fluid in the fluid conduit 30 to flow to the fuel-tank heat exchanger 48 as indicated by arrow 88 in FIG. 2. The valve 54 allows the fluid to flow through the fuel-tank heat exchanger 48 in response to the temperature of the fuel in the first fuel tank 44 being below the first fuel tank predetermined threshold temperature.

Additionally, the valve 54 may also allow the fluid in the fluid conduit 30 to flow to the fuel-tank heat exchanger 48 in response to the temperature of the fluid in the cooling loop 20 directly upstream of the fuel-tank heat exchanger 48. If the temperature of the fluid directly upstream of the fuel-tank heat exchanger 48 is below the first fuel tank predetermined threshold temperature, while the temperature of the fuel in the first fuel tank 44 is equal to or exceeds the first fuel tank predetermined threshold temperature, the valve 54 allows the flow of fluid to the fuel-tank heat exchanger 48. As the fluid in the fluid conduit 30 exits the fuel-tank heat exchanger 48, the flow of fluid returns to the accumulator 38 as indicated by arrow 90 in FIG. 2.

During taxiing or take-off of the aircraft 10, the air flowing through the ram air cooler 22 may be about the same temperature of the fluid in the fluid conduit 30. As such, the heat transfer between the fluid and the air-stream heat exchanger 36 is low such that the heat of the fluid in the cooling loop 20 is not sufficiently removed. To expel heat form the system 12, the valve 54 may allow the fluid in the fluid conduit 30 to flow to the fuel-tank heat exchanger 48 to transfer heat from the fluid in the cooling loop 20 to the fuel in the first fuel tank 44 as shown in FIG. 2.

In the illustrative embodiment, as the valve 54 allows fluid in the fluid conduit 30 to flow to the fuel-tank heat exchanger 48, the valve 54 may fully, or partially, block flow from bypassing the fuel-tank heat exchanger 48 as suggested by the dotted line 92 in FIG. 2. As such, little to no fluid is flowing in the fluid conduit 30 in the region of the dotted line 92 as shown in FIG. 2.

In other embodiments, the valve 54 may partially allow fluid in the fluid conduit 30 to flow through the fuel-tank heat exchanger 48. As such, some fluid may be flowing to the fuel-tank heat exchanger 48 and to the accumulator 38. In such embodiments, the lines 88, 90, 92 would be solid to show the flow of fluid in fluid conduit 30 to each of the components 48, 38.

In the illustrative embodiment, the ram air cooler 22 may be bypassed during taxiing or take off to reduce the amount of drag created by the duct 34. As the majority, if not all, of the heat from the heat source 16 is transferred through the fuel-tank heat exchanger 48; the ram air cooler 22 may be closed off to block air flowing through the ram air cooler 22, to minimize drag.

In the illustrative embodiment, the ram air cooler 22 further includes a variable NACA inlet 33 as shown in FIGS.

2 and 3. The variable NACA inlet 33 will reduce the amount of drag created from the duct 34 when the ram air cooler 22 is not being used. The variable inlet 33 varies the amount of air from the atmosphere 18 through the air-stream heat exchanger 36 as indicated by arrow 35.

As the fluid in the fluid conduit 30 heats the fuel in the first fuel tank 44, the temperature of the fuel approaches the first fuel tank predetermined threshold temperature. However, at higher altitudes, the air is cooler in temperature and therefore the air flowing through the ram air cooler 22 is viable for transferring heat from the fluid to the air. Therefore, as the aircraft 10 increases in altitude and/or speed, the air-stream heat exchanger 36 may begin to transfer more heat from the fluid in the cooling loop 20 to the atmosphere air flowing through the duct 34.

To manage the temperature of the fuel in the first fuel tank 44 and the fluid in the fluid conduit 30, the controller 68 directs the valve 54 to fully, or partially block the flow of the fluid through the fuel-tank heat exchanger 48 based on the temperature measured by the sensors 62, 63, 64, 66, 67 as shown in FIG. 3. If the temperature of the fluid measured by the sensor 66 is above the first fuel tank predetermined threshold temperature, while the temperature of the fuel in the first fuel tank 44 is equal to or exceeds the first fuel tank predetermined threshold temperature, the controller 68 may fully, or partially block the flow of fluid to the fuel-tank heat exchanger 48. Dotted arrows 88, 90, indicate the blocked flow of fluid to the fuel-tank heat exchanger 48.

If the valve 54 blocks the fluid in the cooling loop 20 from flowing to the fuel-tank heat exchanger 48, the fluid flows back to the accumulator 38 as suggested by the arrow 92 in FIG. 3. However, as the air-stream heat exchanger 36 begins to transfer more heat to the air, the fluid in the cooling loop 20 may be cool enough to transfer, or absorb heat from the fuel in the first fuel tank 44.

As such, the valve 54 allows the flow of the fluid in the fluid conduit 30 through the fuel-tank heat exchanger 48 if the temperature of the fluid measured by the sensor 66 is below the first fuel tank predetermined threshold temperature, while the temperature of the fuel in the first fuel tank 44 is equal to or exceeds the first fuel tank predetermined threshold temperature. In this way, the temperature of the fuel in the first fuel tank 44 is reduced in preparation to act as a heat sink later in the flight, as the aircraft 10 descends into warmer air. In such environments, the air-stream heat exchanger 36 may not be able to reject as much heat to the air.

A method of cooling heat loads on an aircraft 10 may include several steps. The method includes conducting a cooling fluid through the cooling loop 20 to transfer heat between the heat source 16 and the fluid in the cooling loop 20, conducting the fluid in the cooling loop 20 to the air-stream heat exchanger 36 to transfer heat between the fluid in the cooling loop 20 and the air passing through the duct 34, and conducting the fluid in the cooling loop 20 to the fuel-tank heat exchanger 48 to transfer heat between the fluid in the cooling loop 20 and fuel stored in the first fuel tank 44. In this way, the fuel in the first and second fuel tanks 44, 46 is not transported to the heat loads 16, but rather, the fluid is brought to the fuel to transfer the heat with the fuel. Transferring heat with the fluid to the fuel in the first fuel tank 44 minimizes safety risks, and heating the fuel prior to burning in the engine 14 may provide additional benefits.

In the illustrative embodiment, the method further includes selectively varying a flow of the fluid in the cooling loop 20 through the air-stream heat exchanger 36 and a flow of the fluid through the fuel-tank heat exchanger 48. Varying the flows of the fluid through the air-stream heat exchanger 36 and the fuel-tank heat exchanger 48 maintains a temperature of the heat source 16 below a predetermined heat load temperature.

In the illustrative embodiment, the method further includes measuring the heat transfer between the fluid and the fuel in the first fuel tank 44 and comparing the heat transfer measured to a predetermined heat rejection schedule. Based on the comparison, the flow of fluid in the cooling loop 20 through the fuel-tank heat exchanger 48 is selectively varied in response to the heat transfer measured being different from the predetermined heat rejection schedule.

In the illustrative embodiment, the method further includes measuring the temperature of the fluid in the cooling loop 20 upstream of the accumulator 38 included in the cooling loop 20 using the sensor 67. The temperature measured is then compared to the sensor target temperature and the flow of fluid in the cooling loop 20 is selectively varied through the air-stream heat exchanger 36 and fuel tank heat exchanger 48 in response to the temperature measured being different from the sensor target temperature.

Figure 4:
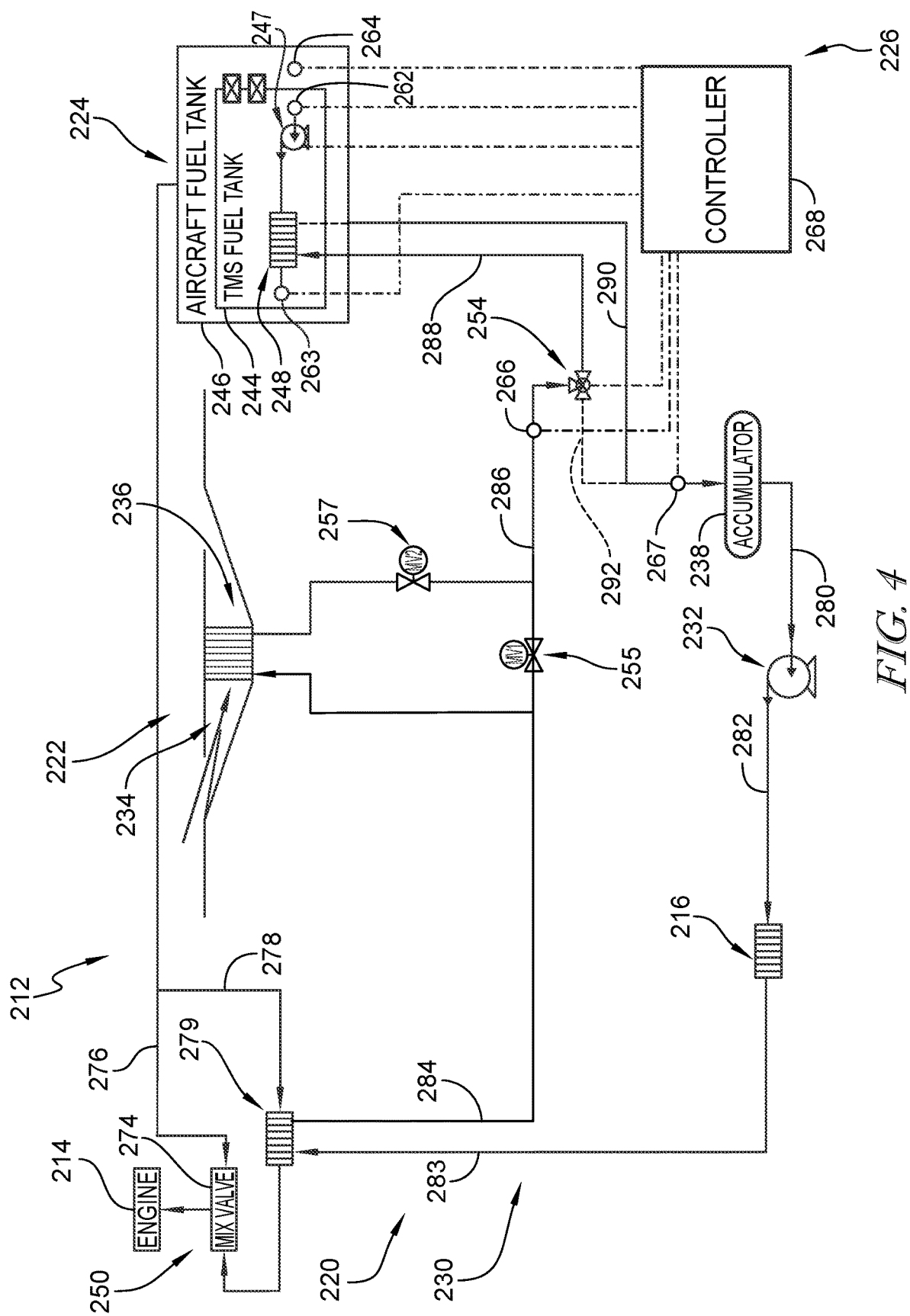
FIG. 4 is a diagrammatic view of another embodiment of a thermal energy system adapted for use in the aircraft of FIG. 1 showing the thermal energy system includes a cooling loop, a ram air cooler, a thermal-storage fuel system configured to transfer heat between the fluid in the cooling loop and fuel stored in a first fuel tank, and an engine-fuel unit configured to transfer heat between the fluid in the cooling loop and fuel from a second fuel tank before being delivered to the gas turbine engine.

Another embodiment of a thermal energy system 212 in accordance with the present disclosure is shown in FIG. 4. The thermal energy system 212 is substantially similar to the thermal energy system 12 shown in FIGS. 1-3 and described herein. Accordingly, similar reference numbers in the 200 series indicate features that are common between the thermal energy system 212 and the thermal energy system 12. The description of the thermal energy system 12 is incorporated by reference to apply to the thermal energy system 212, except in instances when it conflicts with the specific description and the drawings of the thermal energy system 212.

The thermal energy system 212 includes a cooling loop 220, a cooler 222, a thermal-storage fuel system 224, and a control system 226 as shown in FIG. 4. The cooling loop 220 has a fluid conduit 230 and a pump 232 configured to move fluid through the fluid conduit 230 to transfer heat from the heat source 216 to the fluid thereby cooling the heat source 216. The cooler 222 includes a duct 234 configured to conduct air therethrough and an air-stream heat exchanger 236 located in the duct 234. The air-stream heat exchanger 236 is in thermal communication with the fluid conduit 230 to transfer heat between the fluid in the cooling loop 220 and the air passing through the duct 234. The thermal-storage fuel system 224 is configured to transfer heat between the fluid in the cooling loop 220 and fuel stored in the thermal-storage fuel system 224. The control system 226 is configured to control the flow of fluid through the cooling loop 220 to manage the cooling of the heat loads 216 as well as manage the use of the thermal-storage fuel system 224.

The thermal-storage fuel system 224 includes fuel tanks 244, 246, a fuel-tank heat exchanger 248, and an engine-fuel unit 250 as shown in FIG. 4. Both the first fuel tank 244 and second fuel tank 246 are configured to store fuel therein, while the second fuel tank 246 is in fluid communication with the first fuel tank 244. The fuel-tank heat exchanger 248 is in thermal communication with the fluid conduit 230 and is configured to transfer heat between the fluid in the cooling loop 220 and fuel stored in the first fuel tank 244. The engine-fuel unit 250 is configured to receive fuel from the second fuel tank 246 and deliver the fuel to the engine 214. In the illustrative embodiment, the engine-fuel unit 250 is in thermal communication with the cooling loop 220 to transfer heat between the fluid in the cooling loop 220 and the fuel in the engine-fuel unit 250.

The engine-fuel unit 250 includes a mix valve 274, conduits 276, 278, and an engine-fuel heat exchanger 279 as shown in FIG. 4. The first conduit 276 is in fluid communication between the mix valve 274 and the second fuel tank 246 to deliver fuel having a first temperature to the mix valve 274. The second conduit 278 is in fluid communication between the mix valve 274 and the second fuel tank 246. The engine-fuel heat exchanger 279 in thermal communication with the second conduit 278 to cause the second conduit 278 to deliver fuel having a second temperature to the mix valve 274.

In the illustrative embodiment, the mix valve 274 and the conduits 276, 278 form a valve system in fluid communication with the second fuel tank 246 and the engine-fuel heat exchanger 279. The valve system, including the mix valve 274 and the conduits 276, 278, is configured to vary a flow of fuel through the engine-fuel heat exchanger 279 to deliver fuel to the engine 214 at an engine-fuel unit predetermined threshold temperature.

In the illustrative embodiment, the engine-fuel unit predetermined threshold temperature is the desired temperature for the fuel delivered to the engine 214 from the valve system. In some embodiments, the engine-fuel unit predetermined threshold temperature may be equal to a maximum allowable fuel temperature. The maximum allowable fuel temperature is the maximum temperature that the fuel may be when it is passed to the engine 214.

In some embodiments, the mix valve 274 is configured to control the flow of fuel to the engine-fuel heat exchanger 279 to match the maximum allowable fuel temperature. The maximum allowable fuel temperature may vary throughout the flight profile or be a single value.

In some embodiments, the mix valve 274 is configured to vary a first flow rate of fuel from the first conduit 276 and a second flow rate of fuel from the second conduit 278. The mix valve 274 varies the first and second flow rates for the respective conduits 276, 278 to provide a mixed stream of fuel having a third temperature. The third temperature may also be equal to or less than the maximum allowable fuel temperature, which is the temperature at which the fuel can be safely supplied to the engine 214.

The maximum allowable tank temperature of the second fuel tank 246 may be less than the maximum allowable fuel temperature. In this way, the fuel in the second fuel tank 246 may absorb heat from the heat loads 216 and be below the maximum allowable fuel temperature.

In the illustrative embodiments, the maximum allowable tank temperature of the second fuel tank 246 may be less than the maximum allowable tank temperature of the first fuel tank 244. The maximum allowable fuel temperature, i.e. the temperature at which the fuel can be safely supplied to the engine 14, may be equal to or greater than the maximum allowable tank temperature of the second tank 246.

The maximum allowable tank temperature of the first fuel tank 244 may be greater than or equal to the maximum allowable fuel temperature. The fuel in the first fuel tank 244 may be heated to a temperature greater than that of the maximum allowable fuel temperature for the engine 214 because the first fuel tank 244 may be cooled during the mission before the fuel in the first fuel tank 244 may need to be sent to the engine 214.

In some embodiments, the engine-fuel unit predetermined threshold temperature may be equal to or greater than the first fuel tank predetermined threshold temperature. In some embodiments, the engine-fuel unit predetermined threshold temperature may vary throughout the flight mission.

Turning again to the control system 226, the control system 226 includes the valves 254, 255, 257, sensors 262, 263, 264, 266, 267, and a controller 268 as shown in FIG. 4. The valve 254 is connected to the fluid conduit 230 and configured to selectively cause a flow of fluid to bypass the fuel-tank heat exchanger 248. The valves 255, 257 are connected to the fluid conduit 230 and configured to selectively vary the flow through the heat exchanger 236. The sensor 262 is configured to measure the temperature of the fuel at the inlet of a fuel pump 247, while the sensor 263 is configured to measure the temperature of the fuel at the outlet of the fuel pump 47. The sensor 264 is configured to measure the temperature of the fluid in the fuel tank 246. The sensor 266 is configured to measure the temperature of the fluid in the cooling loop 20 directly upstream of the fuel-tank heat exchanger 248 as it enters the fuel-tank heat exchanger 248. The sensor 267 is configured to measure the temperature of the fluid in the cooling loop 220 as it returns to an accumulator 238 included in the cooling loop 220.

The controller 268 is configured to manage the cooling of the heat loads 216 as well as the use of the thermal-storage fuel system 224. The controller 268 is configured to direct the valves 254, 255, 257 to vary the flow of the fluid in the cooling loop 220. The controller 268 is also configured to control the fuel pump flow rate by the fuel pump 247 included in the thermal-storage fuel system 224 through the fuel-tank heat exchanger 248. The controller 268 controls the valves 254, 255, 257 and the fuel pump 247 so as to maintain the fluid in the cooling loop 220 at a predetermined temperature.

In the illustrative embodiments, the controller 268 is configured to allow the flow of the fluid in the cooling loop 220 through the fuel-tank heat exchanger 248 based on a temperature measured by the sensor 262. The controller 268 directs the valve 254 to allow the fluid in the cooling loop 220 through the fuel-tank heat exchanger 248 in response to a temperature of the fuel in the first fuel tank 244 being below the first fuel tank predetermined threshold temperature.

In the illustrative embodiments, the controller 268 is also configured to allow the flow of the fluid in the cooling loop 220 through the fuel-tank heat exchanger 248 based on the temperature measured by the sensors 262, 263, 266, 267. The controller 268 may be configured to direct the valve 254 to control the fluid in the cooling loop 220 through the fuel-tank heat exchanger 248 in response to a temperature measured by at least one of the sensors 262, 263, 266, 267.

If the temperature of the fluid directly upstream of the fuel-tank heat exchanger 248 is below the first fuel tank predetermined threshold temperature, while the temperature of the fuel in the first fuel tank 244 is equal to or exceeds the first fuel tank predetermined threshold temperature, the controller 268 allows the flow of fluid to the fuel-tank heat exchanger 248. Conversely, if the temperature of the fluid directly upstream of the fuel-tank heat exchanger 248 is above the first fuel tank predetermined threshold temperature, while the temperature of the fuel in the first fuel tank 244 is equal to or exceeds the first fuel tank predetermined threshold temperature, the controller 268 may fully, or partially block the flow of fluid to the fuel-tank heat exchanger 248.

In other embodiments, if the temperature of the fluid returning to the accumulator 238 measured by the sensor 267 is below the sensor target temperature, the controller 268 may direct the valve 254 to allow the flow of fluid to the fuel-tank heat exchanger 248, if the fuel tank temperature is higher than the sensor target temperature. Conversely, if the temperature measured by the sensor 267 is above the sensor target temperature, the controller 268 may direct the valve 254 to fully, or partially block the flow of fluid to the fuel-tank heat exchanger 248 if the fuel tank temperature is higher than the sensor temperature. However, if the fuel tank temperature is lower than the sensor target temperature, valve 254 will pass flow to the fuel tank to provide cooling to the fluid.

During use of the thermal energy system 212 in the aircraft 10, the fluid in the fluid conduit 230 is pumped from the accumulator 238 included in the cooling loop 220 to the heat source 216 as indicted by arrow 280. The pump 232 moves the fluid through the fluid conduit 230 to transfer heat from the heat source 216 to the fluid to cool the heat source 216 as indicted by arrow 282. Moving from the heat source 216, the flow of fluid in the fluid conduit 230 moves through the engine-fuel heat exchanger 279 of the engine-fuel unit 250 as indicated by arrow 283. The fluid in the fluid conduit 230 is in fluid communication with the engine-fuel heat exchanger 279 to transfer heat between the fluid and the fuel flowing to the engine 214.

As the fluid in the fluid conduit 230 exits the engine-fuel unit 250, the fluid flows to the ram-air heat exchanger 236 as indicated by arrow 284. The fluid flows through the ram-air heat exchanger 236 to transfer heat between the fluid in the cooling loop 20 and the air passing through the duct 34 of the ram air cooler 22.

As the fluid in the fluid conduit 230 exits the ram-air heat exchanger 236 as indicated by arrow 286, the valve 254 controls the flow of fluid to the thermal-storage fuel system 224. The valve 254 is configured to selectively cause the flow of fluid to bypass the fuel-tank heat exchanger 248 based at least in part on the temperature measured by the sensors 262, 263, 264, 266, 267.

The valve 254 may allow the fluid in the fluid conduit 230 to flow to the fuel-tank heat exchanger 248 in response to the temperature of the fuel in the first fuel tank 244 being below the first fuel tank predetermined threshold temperature as indicated by arrow 288. The valve 254 may also allow the fluid to flow to the fuel-tank heat exchanger 248 in response to the temperature of the fluid directly upstream of the fuel-tank heat exchanger 248 being below the first fuel tank predetermined threshold temperature, while the temperature of the fuel in the first fuel tank 44 is equal to or exceeds the first fuel tank predetermined threshold temperature.

In the illustrative embodiment, as the valve 254 allows fluid in the fluid conduit 230 to flow to the fuel-tank heat exchanger 248, the valve 254 blocks flow from bypassing the fuel-tank heat exchanger 248 as suggested by the dotted line 292 in FIG. 4. As such, no fluid is flowing in the fluid conduit 230 in the region of the dotted line 292. As the fluid in the fluid conduit 230 exits the fuel-tank heat exchanger 248, the flow of fluid returns to the accumulator 238 as show by arrow 290.

As discussed above, the controller 268 is configured to direct the valve 254 to fully, or partially block the flow of the fluid in the fluid conduit 230 through the fuel-tank heat exchanger 248 based on the temperature measured by the sensors 262, 263, 264, 266, 267. If the valve 254 partially or fully blocks the fluid in the fluid conduit 230 from flowing to the fuel-tank heat exchanger 248, the rest or all of fluid flows to the accumulator 238. As such, little to no fluid is flowing in the fluid conduit 230 in and out of the fuel-tank heat exchanger 248.

As the fluid in the fluid conduit 230 heats the fuel in the first fuel tank 244, the temperature of the fuel approaches the first fuel tank predetermined threshold temperature. As such, the fuel in the second fuel tank 246 may be used as an additional heat sink to prevent the temperature of the fuel in the first fuel tank 244 from exceeding the first fuel tank predetermined threshold temperature.

The fluid in the fluid conduit 230 flowing to the engine-fuel heat exchanger 279 heats the fuel in the second conduit 278 to cool the fluid in the fluid conduit 230. The mix valve 274 varies the first flow rate of fuel from the first conduit 276 and the second flow rate of fuel from the second conduit 278 to provide the mixed stream of fuel with the third temperature. In the illustrative embodiments, the controller 268 control the flow of fluid to put as much heat into the fuel flowing through the engine-fuel heat exchanger 279 without exceeding the engine-fuel unit predetermined threshold temperature.

However, at higher altitudes, the air is cooler in temperature and therefore the air flowing through the cooler 222 is viable for transferring heat between the fluid and the air. Therefore, as the aircraft 10 increases in altitude, the ram-air heat exchanger 236 may begin to transfer more heat between the fluid in the cooling loop 220 and the atmosphere air flowing through the duct 234.

As the engine-fuel unit 250 and the ram-air heat exchanger 236 begin to transfer more heat out of the system, the fluid in the cooling loop 220 may be cool enough to transfer heat from the fuel in the first fuel tank 244. Thus, during flight, the temperature of the first fuel tank 244 is lowered below the maximum allowable tank temperature of the first tank 244. This cooling process allows the first fuel tank 244 to be able to absorb more heat from the fluid in the cooling loop 220 later in the flight cycle when cooling the fluid in the fluid conduit 230 may be more challenging. In this way, the temperature of the fuel in the first fuel tank 244 is reduced in preparation to act as a heat sink later in the flight, as the aircraft 10 descends into warmer air. In such environments, the air-stream heat exchanger 236 may not be able to reject as much heat to the air.

In the illustrative embodiment, the fluid in the cooling loop is conducted to the engine-fuel unit before it is conducted to the air-stream heat exchanger. The fluid in the cooling loop is conducted to the engine-fuel unit before the air-stream heat exchanger to transfer heat between the fluid in the cooling loop and the fuel in the engine-fuel unit.

A method of cooling heat loads on the aircraft 10 may include several steps and may be substantially similar to the method described in regards to the embodiment shown in FIGS. 1-3. The method further includes varying the flow of fuel through the engine-fuel heat exchanger 279 to deliver fuel to the engine 214 at the engine-fuel unit predetermined threshold temperature. The mix valve 274 varies the first flow rate of fuel from the first conduit 276 and the second flow rate of fuel from the second conduit 278 to provide the mixed stream of fuel. The mixed stream of fuel has the third temperature that is less than or equal to the engine-fuel unit predetermined threshold temperature.

Figure 5:
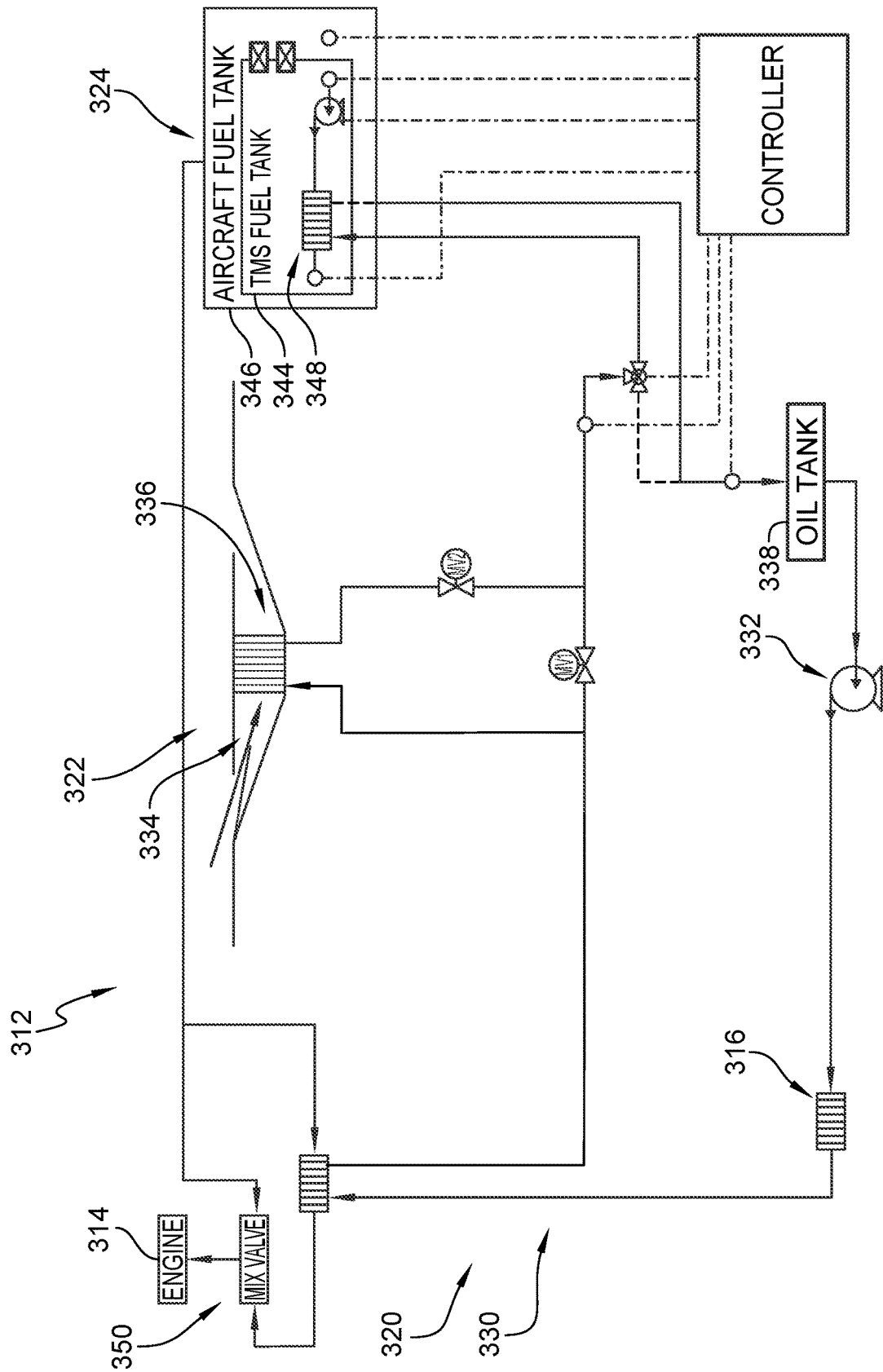
FIG. 5 is a diagrammatic view of another embodiment of a thermal energy system adapted for use in the aircraft of FIG. 1 showing the thermal energy system includes a cooling loop configured to move oil through system to transfer heat from a heat source to the oil in the fluid conduit to cool the heat source, a ram air cooler, a thermal-storage fuel system configured to transfer heat between the oil in the cooling loop and fuel stored in a first fuel tank, and an engine-fuel unit configured to transfer heat from the oil in the cooling loop to the fuel stored in a second fuel tank before being delivered to the gas turbine engine.

Another embodiment of a thermal energy system 312 in accordance with the present disclosure is shown in FIG. 5. The thermal energy system 312 is substantially similar to the thermal energy system 12 shown in FIGS. 1-3 and described herein. Accordingly, similar reference numbers in the 300 series indicate features that are common between the thermal energy system 312 and the thermal energy system 12. The description of the thermal energy system 12 is incorporated by reference to apply to the thermal energy system 312, except in instances when it conflicts with the specific description and the drawings of the thermal energy system 312.

The thermal energy system 312 includes a cooling loop 320, a cooler 322, and a thermal-storage fuel system 324 as shown in FIG. 5. The cooling loop 320 has a fluid conduit 330 and a pump 332 configured to move fluid through the fluid conduit 330 to transfer heat from the heat source 316 to the fluid in the fluid conduit 330 thereby cooling the heat source 316. The cooler 322 includes a duct 334 configured to receive air from the atmosphere 18 and an air-stream heat exchanger 336 located in the duct 334. The air-stream heat exchanger 336 is in thermal communication with the fluid conduit 330 to transfer heat between the fluid in the cooling loop 320 and the air passing through the duct 334. The thermal-storage fuel system 324 is configured to transfer heat between the fluid in the cooling loop 320 and fuel stored in the thermal-storage fuel system 324.

The fluid in the illustrative embodiment is oil, which is stored in an oil tank 338 included in the cooling loop 320 as shown in FIG. 5. In the other embodiments, the fluid of the cooling loop 20, 220 is a refrigerant. In the illustrative embodiment of FIG. 5, the oil tank 338 replaces the accumulator using oil as the fluid in the cooling loop 320.

The thermal-storage fuel system 324 includes fuel tanks 344, 346, a fuel-tank heat exchanger 348, and an engine-fuel unit 350 as shown in FIG. 5. Both the first fuel tank 344 and second fuel tank 346 are configured to store fuel therein, while the second fuel tank 346 is in fluid communication with the first fuel tank 344. The fuel-tank heat exchanger 348 is in thermal communication with the fluid conduit 330 and is configured to transfer heat from the oil in the cooling loop 320 and fuel stored in the first fuel tank 344. The engine-fuel unit 350 is configured to receive fuel from the second fuel tank 346 and deliver the fuel to the engine 314. In the illustrative embodiment, the engine-fuel unit 350 is in thermal communication with the cooling loop 320 to transfer heat from the oil in the cooling loop 320 to the fuel in the engine-fuel unit 350.

Figure 6:
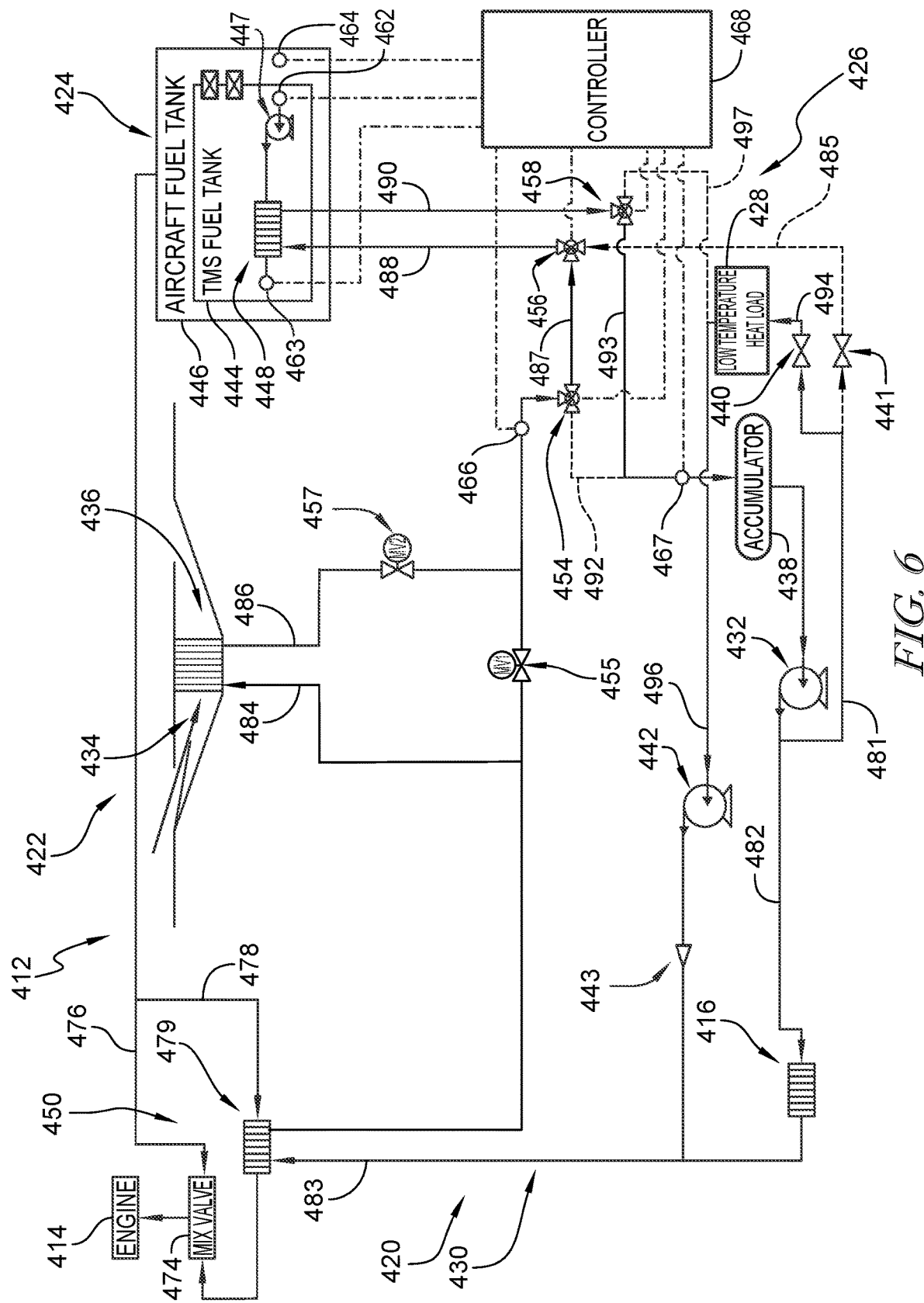
FIG. 6 is a diagrammatic view of another embodiment of a thermal energy system adapted for use in the aircraft of FIG. 1 showing the thermal energy system includes a cooling loop, a ram air cooler, a thermal-storage fuel system, and a low temperature heat load in thermal communication with the fluid conduit for transferring heat to the fluid in the fluid conduit.
Figure 7:
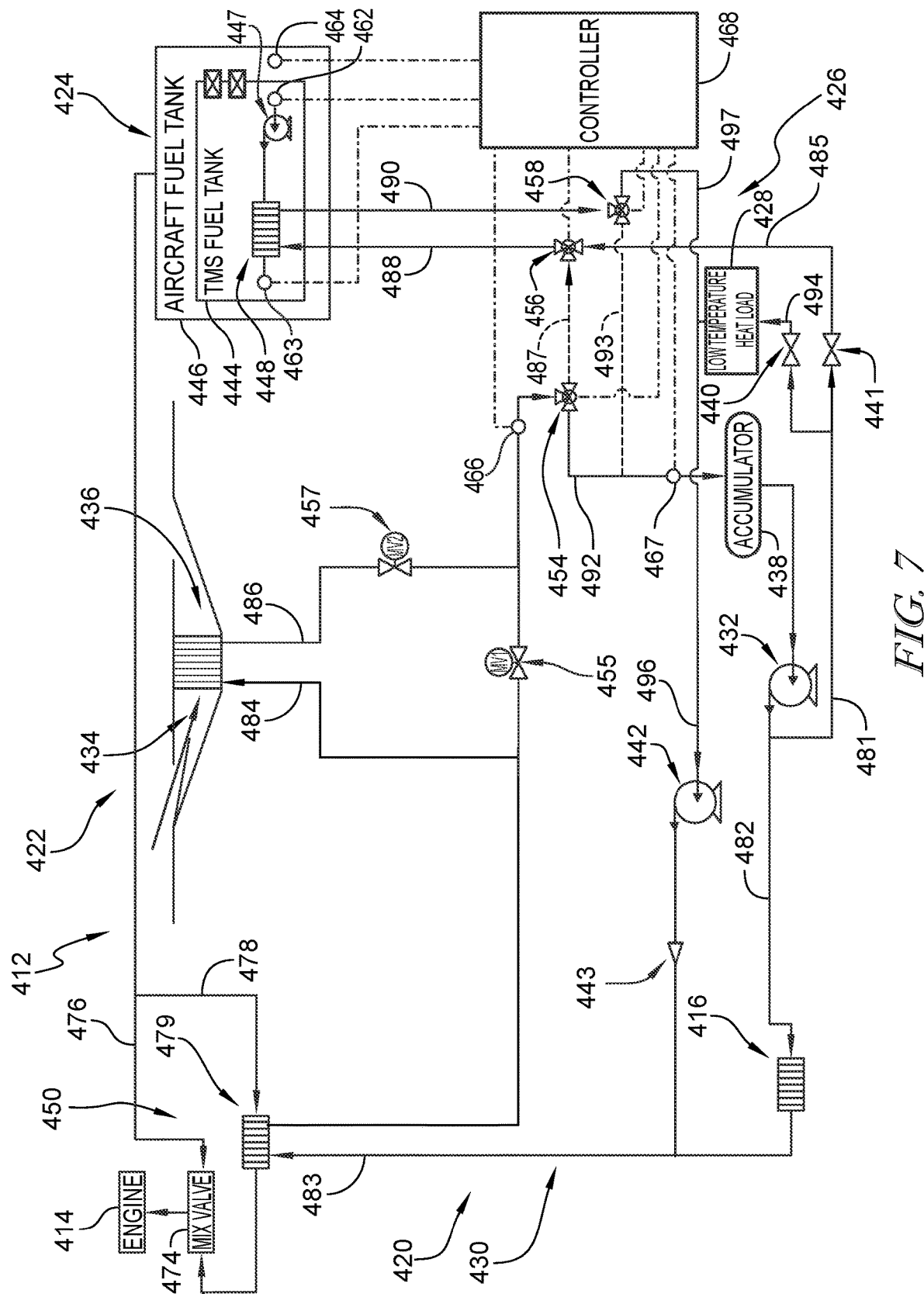
FIG. 7 is a diagrammatic view similar to FIG. 6 showing the thermal energy system further includes a control system having a plurality of valves connected to the fluid conduit and a controller connected to the plurality of valves to operate the plurality of valves and control the flow of fluid through the thermal-storage fuel system.

Another embodiment of a thermal energy system 412 in accordance with the present disclosure is shown in FIGS. 6 and 7. The thermal energy system 412 is substantially similar to the thermal energy system 12 shown in FIGS. 1-3 and described herein. Accordingly, similar reference numbers in the 400 series indicate features that are common between the thermal energy system 412 and the thermal energy system 12. The description of the thermal energy system 12 is incorporated by reference to apply to the thermal energy system 412, except in instances when it conflicts with the specific description and the drawings of the thermal energy system 412.

The thermal energy system 412 includes a cooling loop 420, a cooler 422, a thermal-storage fuel system 424, a control system 426, a first heat source 416, and a second heat source 428 as shown in FIGS. 6 and 7. The cooling loop 420 has a fluid conduit 430 and a pump 432 configured to move fluid through the fluid conduit 430 to transfer heat from the heat sources 416, 428 to the fluid in the fluid conduit 430 thereby cooling the heat sources 416, 428. The cooler 422 includes a duct 434 configured to receive air from the atmosphere 18 and an air-stream heat exchanger 436 located in the duct 434 to transfer heat between the fluid in the cooling loop 420 and the air passing through the duct 434. The thermal-storage fuel system 424 is configured to transfer heat between the fluid in the cooling loop 420 and fuel stored in the thermal-storage fuel system 424. The control system 426 is configured to control the flow of fluid through the fluid conduit 430.

The first heat source 416 is a high temperature heat source 416, while the second heat source 428 is a low temperature heat source 428. The low temperature heat source 428 may need to be kept cooler or at a lower temperature than the high temperature heat source 416.

In the illustrative embodiment, the low temperature device 428 is a battery 428. In other embodiments, the low temperature device 428 may be another low temperature device, such as solid state electronics, a light-emitting diode ("LED"), an analog circuit, a digital circuit, a computer, a server, a server farm, a data center, a hoteling circuit such as vehicle electronics, a vehicle such as an aircraft, a directed-energy weapon, a laser, a plasma weapon, a microwave generator, a pulse-powered device, a satellite uplink, an electric motor or generator, an electric device, etc.

In the illustrative embodiment, the cooling loop 420 is structured to conduct the fluid heated from the first heat source 416 and the second heat source 428 first through an engine-fuel heat exchanger 479. Then the fluid in the cooling loop 420 is conducted through the air-stream heat exchanger 436 after the engine-fuel heat exchanger 479. Then the fluid in the cooling loop 420 is conducted through a fuel-tank heat exchanger 448 after the air-stream heat exchanger 436.

In the illustrative embodiment, the cooling loop 420 further includes a plurality of expansion valves 440, 441 and a compressor 442. The first expansion valve 440 is arranged upstream of the low temperature device 428. The second expansion valve 441 is arranged upstream of the thermal-storage fuel system 424. The compressor 442 is arranged downstream of the low temperature device 428.

In the illustrative embodiment, the cooling fluid in the cooling loop 420 is a two-phase fluid. The expansion valves 440, 441, in conjunction with the compressor 442, are configured to reduce the pressure of the fluid in the cooling loop 420 between the expansion valves 440, 441 and the compressor 442. By reducing the pressure of the fluid, the temperature is lowered, which allows the fluid to effectively absorb heat.

In the illustrative embodiment, the cooling loop 420 is structured to conduct fluid through the second expansion valve 441 and through the fuel-tank heat exchanger 448 after the second expansion valve 441. Then the cooling loop 420 conducts the fluid through the compressor 442 after the fuel-tank heat exchanger 448, through the engine-fuel heat exchanger 479 after the compressor 442, and through the air-stream heat exchanger 436 after the engine-fuel heat exchanger 479.

The thermal-storage fuel system 424 includes fuel tanks 444, 446, the fuel-tank heat exchanger 448, and an engine-fuel unit 450 as shown in FIGS. 6 and 7. Both the first fuel tank 444 and second fuel tank 446 are configured to store fuel therein, while the fuel-tank heat exchanger 448 is in thermal communication with the fluid conduit of the cooling loop 420 to transfer heat between the fluid in the cooling loop 420 and fuel stored in the first fuel tank 444. The engine-fuel unit 450 is configured to receive fuel from the second fuel tank 446 and deliver the fuel to the engine 414. In the illustrative embodiment, the engine-fuel unit 450 is in thermal communication with the cooling loop 420 to transfer heat between the fluid in the cooling loop 420 and the fuel in the engine-fuel unit 450.

The control system 426 includes a plurality of valves 454, 455, 456, 457, 458, sensors 462, 463, 464, 466, 467, and a controller 468 as shown in FIGS. 6 and 7. The valves 454, 455, 456, 457, 458 are connected to the fluid conduit 430 and configured to selectively control the flow of fluid through the cooling loop 420. The sensors 462, 463, 464, 466, 467 are configured to measure the temperature of the fuel in the fuel tanks 444, 446 and the temperature of the fluid in the fluid conduit 430 of the cooling loop 420. The controller 468 is configured to operate the plurality of valves 454, 455, 456, 457, 458 to allow the fluid to flow through the fluid conduit 430 based at least in part on the information measured by the sensors 462, 463, 464, 466, 467.

The controller 468 is configured to manage the cooling of the heat loads 416 as well as the use of the thermal-storage fuel system 424. The controller 468 is configured to direct the valves 454, 455, 456, 457, 458 to vary the flow of the fluid in the cooling loop 420. The controller 468 is also configured to control the fuel pump flow rate of the fuel pump 447 included in the thermal-storage fuel system 424 through the fuel-tank heat exchanger 448. The controller 468 controls the valves 454, 455, 456, 457, 458 and the fuel pump 447 so as to maintain the fluid in the cooling loop 420 at a predetermined temperature.

The plurality of valves 454, 455, 456, 457, 458 includes a first valve 454, a second valve 456, a third valve 458, and modulating valves 455, 457 as shown in FIGS. 6 and 7. The first valve 454 is connected to the fluid conduit 430 downstream of the air-stream heat exchanger 436 and is configured to selectively cause the flow of fluid to bypass the fuel-tank heat exchanger 448. The second valve 456 is connected to the fluid conduit 430 downstream of the first valve 454 and the expansion valve 441 and is configured to selectively control the flow of fluid through the fuel-tank heat exchanger 448. The third valve 458 is connected to the fluid conduit downstream of the fuel-tank heat exchanger 448 and is configured to selectively control the flow of fluid to the compressor 442 or back to the accumulator 438. The valves 455, 457 are configured to vary the flow rate of the fluid in the cooling loop 420 through the air-stream heat exchanger 436.

The control system 426 is configured to selectively vary a flow of the fluid in the cooling loop 420 through the air-stream heat exchanger 436 and the fuel-tank heat exchanger 448 to maintain a temperature of the high temperature heat source 416 below a predetermined heat load temperature.

In some embodiments, the controller 468 may be configured to determine an amount of heat transfer to the fuel in the first fuel tank 444 and operate the plurality of valves 454, 455, 456, 457, 458 to selectively vary the flow of fluid in the cooling loop 420 through the air-stream heat exchanger 436 and the fuel-tank heat exchanger 448 in response to the amount of heat transferred being different from a predetermined heat rejection schedule.

In some embodiments, the controller 468 is configured to determine a temperature of the fluid in the cooling loop 420 upstream of the accumulator 438 included in the cooling loop 420. The controller 468 may operate the valves, 455, 457 to vary the flow of fluid in the cooling loop 420 through the air-stream heat exchanger 436 in response to the temperature of the fluid in the cooling loop 420 upstream of the accumulator 438 measured by the sensor 467 being different than a sensor target temperature.

In the illustrative embodiment, the controller 468 is configured to operate the plurality of valves 454, 455, 456, 457, 458 to allow the fluid to flow through the fuel-tank heat exchanger 448 based on inputs form the control system 426. The plurality of valves 454, 456, 458 allow or block fluid from flowing through the fuel-tank heat exchanger 448 in response to the controller 468 receiving different signals. The modulating valves 455, 457 control the flow of fluid through the air-stream heat exchanger 436. The controller 468 may also be configured to operate the expansion valves 440, 441 and the compressor 442 to allow the fluid to flow through the expansion valves 440, 441 and the compressor 442.

The plurality of valves 454, 456, 458 allow fluid to flow through the fuel-tank heat exchanger 448 if the controller 468 receives a first signal and/or a second signal. The first signal is indicative of a temperature of the fuel in the first fuel tank 444 being equal to or above a predetermined maximum allowable tank temperature of the first fuel tank 444, i.e. the maximum allowable temperature of the fuel in the first fuel tank 444 at that time of the mission. The second signal is indicative of a temperature of the cooling fluid directly upstream of the fuel-tank heat exchanger 448 being below the predetermined maximum allowable tank temperature, i.e. the maximum allowable temperature of the fuel in the first fuel tank 444 at that time of the mission.

The predetermined maximum allowable tank temperature, or the target temperature for the first fuel tank 444, is the maximum allowable temperature of the fuel in the first fuel tank 444 at that specific time of the mission. In the illustrative embodiment, the controller 468 is configured to determine the changes of the predetermined maximum allowable tank temperature throughout the mission.

The maximum allowable fuel temperature for the engine 414 may also change throughout the mission. Therefore, the predetermined maximum allowable fuel temperature is the maximum allowable temperature of the fuel supplied to the engine 414 at that time of the mission. In the illustrative embodiment, the controller 468 is configured to determine the changes of the predetermined maximum allowable fuel temperature throughout the mission.

In the illustrative embodiment, the controller 468 may be configured determine the amount of heat to add to or remove from the first fuel tank 444 based on the predetermined maximum allowable fuel temperature at different times over the course of the mission and control the plurality of valves 454, 456, 458 accordingly. Therefore, the plurality of valves 454, 456, 458 may allow fluid to flow through the fuel-tank heat exchanger 448 based on the predetermined maximum allowable fuel temperature at different times over the course of the mission.

In the illustrative embodiment, the controller 468 is configured to determine the changes of the predetermined maximum allowable tank temperature throughout the mission. In some instances, the predetermined maximum allowable tank temperature may be greater than the predetermined maximum allowable fuel temperature.

In some embodiments, the plurality of valves 454, 456, 458 may allow fluid to flow through the fuel-tank heat exchanger 448 if the controller 468 receives a third signal. The third signal may be indicative of the air temperature outside the aircraft. In other words, the third signal may be indicative of the thermal energy system 12 being a predetermined altitude above ground where the air temperature is relatively cool. In other embodiments, the air temperature at ground level may be cool enough to provide cooling to the fuel tanks 444, 446.

In the illustrative embodiments, the controller 468 is configured to operate the plurality of valves 454, 456, 458 to allow the fluid to flow through the fuel-tank heat exchanger 448 in response to the controller 468 receiving a fourth signal. The fourth signal is indicative of a take-off mode of the aircraft 10.

The engine-fuel unit 450 includes a mix valve 474, conduits 476, 478, and the engine-fuel heat exchanger 479 as shown in FIGS. 6 and 7. The first conduit 476 is in fluid communication between the mix valve 474 and the second fuel tank 446 to deliver fuel having a first temperature to the mix valve 474. The second conduit 478 is in fluid communication between the mix valve 474 and the second fuel tank 446. The engine-fuel heat exchanger 479 in thermal communication with the second conduit 478 to cause the second conduit 478 to deliver fuel having a second temperature to the mix valve 474.

During use of the thermal energy system 412 in the aircraft 10, the fluid in the fluid conduit 430 is pumped from an accumulator 438 included in the cooling loop 420 to the heat source 416 as indicted by arrow 482 and to the expansion valves 440, 441 as indicated by arrow 481 in FIGS. 6 and 7. The pump 432 moves the fluid through the fluid conduit 430 to transfer heat from the heat source 416 to the fluid to cool the heat source 416. The pump 432 also moves the fluid through the expansion valve 440 as indicated by arrow 481 in FIGS. 6 and 7. The fluid is expanded through the expansion valve 440 such that the fluid has a temperature lower than desired operating temperature of the battery 428, in order to remove heat from the battery 428.

Moving from the heat source 416, the flow of fluid in the fluid conduit 430 moves through the engine-fuel heat exchanger 479 of the engine-fuel unit 450 as indicated by arrow 483 in FIGS. 6 and 7. The fluid in the fluid conduit 430 is in fluid communication with the engine-fuel heat exchanger 479 to transfer heat between the fluid to the fuel flowing and the engine 414.

Simultaneously, as the fluid exits the expansion valve 440, the fluid in the fluid conduit 430 moves across the low temperature heat loads 428 as indicated by arrow 494 as shown in FIGS. 6 and 7. As the fluid moves across the low temperature heat loads 428, the low temperature heat loads 428 transfers heat to the fluid to cause the fluid to vaporize. The vapor than flows to the compressor 442 as indicated by arrow 496. The compressor 442 compresses the vapor in the fluid conduit 430 to the pressure that is in the conduit 430, and in the process increases the fluids temperature, in order for the fluid to be cooled by the engine-fuel heat exchanger 479 and/or the air-stream heat exchanger 436.

The fluid from the compressor 442 and the heat source 416 then flows to the engine-fuel heat exchanger 479 as indicated by arrow 483 in FIGS. 6 and 7. The fluid in the fluid conduit 430 may reject at least some heat to the fuel flowing through the engine-fuel heat exchanger 479 to cool the fluid in the cooling loop 420. The mix valve 474 varies the flow of fuel from the fluid conduits 476, 478 to adjust the temperature of the fuel provided to the engine 414.

As the fluid in the fluid conduit 430 exits the engine-fuel unit 450, some or all of the fluid flow may be passed to the air-stream heat exchanger 436 as indicated by arrow 484 as shown in FIGS. 6 and 7. The fluid flows through the air-stream heat exchanger 436 to transfer additional heat from the fluid in the cooling loop 420 to the air passing through the duct 434 of the cooler 422.

As the fluid in the fluid conduit 430 exits the air-stream heat exchanger 436 as indicated by arrow 486, the valve 454 controls the flow of fluid to the thermal-storage fuel system 424. The valve 454 is configured to selectively cause the flow of fluid to bypass the fuel-tank heat exchanger 448 based at least in part on the temperature measured by the sensors 462, 463, 464, 466, 467 as discussed above and as discussed in the other embodiments. If the controller 468 detects the first signal and/or the second signal, the valve 454 allows fluid to flow through the fuel-tank heat exchanger 448 as indicated by arrow 487 as shown in FIG. 6.

In the illustrative embodiment, as the valve 454 allows fluid in the fluid conduit 430 to flow to the fuel-tank heat exchanger 448, the valve 454 partially or fully blocks flow from bypassing the fuel-tank heat exchanger 448 as suggested by the dotted line 492 in FIG. 6. As such, little to no fluid is flowing in the fluid conduit 430 in the region of the dotted line 492 in FIG. 6.

Conversely, the valve 454 blocks the flow of the fluid through the fuel-tank heat exchanger 448 based on the temperature measured by the sensors 462, 463, 464, 466, 467 as indicated by the dotted arrow 487 shown in FIG. 7. If the valve 454 partially or fully blocks the fluid in the fluid conduit 430 from flowing to the fuel-tank heat exchanger 448, the rest or all of the fluid flows to the accumulator 438 as indicated by the arrow 492 in FIG. 7.

The valve 456 is connected to the fluid conduit 430 downstream of the expansion valve 441 and the valve 454 as shown in FIGS. 6 and 7. The valve 456 is configured to selectively control the flow of fluid from the expansion valve 441 and the air-stream heat exchanger 436 based at least in part on the temperature measured by the sensors 462, 464, 466 as discussed above.

If the controller 468 detects the first and second signals, the valve 456 is configured to allow all or some of the fluid in the cooling loop 420 exiting the air-stream heat exchanger 436 to flow through the fuel-tank heat exchanger 448 as indicated by arrow 488 in FIG. 6.

Conversely, if the temperature of the fuel in the first fuel tank 444 is equal to or above the predetermined maximum allowable tank temperature and the temperature of the air outside the aircraft 10 is relatively too hot, the valve 456 may fully, or partially block the fluid in the cooling loop 420 exiting the air-stream heat exchanger 436 through the fuel-tank heat exchanger 448. Similarly, if the temperature of the fuel in the first fuel tank 444 is equal to or above the predetermined maximum allowable fuel temperature and the temperature of the fluid exiting the air-stream heat exchanger 436 is above the predetermined maximum tank temperature, the valve 456 may fully, or partially block fluid in the cooling loop 420 to flow through the fuel-tank heat exchanger 448.

In such instances, the expansion valve 441 may be allowed to provide fluid to cool the fuel in the first fuel tank 444. The fluid from the expansion valve 441 is able to further cool the fuel in the first fuel tank 444 than what is possible with the air-stream heat exchanger 436. In some instances, the air flowing through the air-stream heat exchanger 436 may be relatively high when the aircraft 10 and thus the thermal energy system 12 is below the predetermined altitude.

In some embodiments, if the temperature of the fuel in the first fuel tank 444 is equal to or above the predetermined maximum allowable tank temperature and the air flowing through the air-stream heat exchanger 436 is relatively high, the expansion valve 441 allows the fluid from the expansion valve 441 to flow through the fuel-tank heat exchanger 448 as indicated by the arrow 488 in FIG. 7. Likewise, if the temperature of the fuel in the first fuel tank 444 is equal to or above the predetermined maximum allowable fuel temperature and the temperature of the fluid exiting the air-stream heat exchanger 436 is above the predetermined maximum tank temperature, the valve 456 allows fluid in the cooling loop 420 from the expansion valve 441 to flow through the fuel-tank heat exchanger 448.

The fluid in the cooling loop 420 from the expansion valve 441 is at a lower temperature than the temperature of the fluid at sensor 466, which may allow the fluid to remove heat from the fuel in the first fuel tank 444 at a faster rate and/or to a lower temperature than if cooled with fluid coming from heat exchanger 436. The fluid in the cooling loop 420 from the expansion valve 441 flowing through the fuel-tank heat exchanger 448 is vaporized and compressed. The third valve 458 controls the fluid in the cooling loop 420 as it exits the fuel-tank heat exchanger 448.

If the second valve 456 allowed the flow of fluid from the air-stream heat exchanger 436, the valve 458 directs the flow of fluid exiting the fuel-tank heat exchanger 448 (indicated by arrow 490) to return to the accumulator 438 as indicated by arrow 493 in FIG. 6. As such, the valve 458 fully blocks the flow of fluid to the compressor 442 as indicated by dotted arrow 497 in FIG. 6. Furthermore, a check valve 443 may be added downstream of the compressor 442, to prevent liquid from entering the compressor 442 when the compressor 442 is not in operation.

Conversely, if the second valve 456 allows the flow of fluid from the expansion valve 441, the valve 458 allows the flow of the fluid exiting the fuel-tank heat exchanger 448 to flow to the compressor 442 as indicated by arrow 497 in FIG. 7. As such, the valve 458 fully blocks the flow of fluid to the accumulator 438 as indicated by dotted line 493 in FIG. 7.

A method of cooling heat loads on the aircraft 10 may include several steps. The method includes conducting the fluid through the cooling loop 420 to transfer heat between the first heat source 416 and the fluid in the cooling loop 420 and conducting the fluid through the cooling loop 420 to transfer heat between the second heat source 428 and the fluid in the cooling loop 420. The method also includes conducting the fluid in the cooling loop 420 to the air-stream heat exchanger 436 to transfer heat between the fluid in the cooling loop 420 and the air passing through the duct 434 and conducting the fluid in the cooling loop 420 to the fuel-tank heat exchanger 448 to transfer heat between the fluid in the cooling loop 420 and fuel stored in the first fuel tank 444.

In the illustrative embodiment, the method further includes selectively varying a flow of the fluid in the cooling loop 420 through the air-stream heat exchanger 436 and a flow of the fluid through the fuel-tank heat exchanger 448. Varying the flow of the fluid through the air-stream heat exchanger 436 and the fuel-tank heat exchanger 448 maintains a temperature of the first heat source 416 below the predetermined heat load temperature.

In the illustrative embodiment, the method further comprises conducting the fluid in the cooling loop 420 to the engine-fuel unit 450. The fluid in the cooling loop 420 is conducted to the engine-fuel unit 450 before the fluid is conducted to the air-stream heat exchanger 436 to transfer heat between the fluid in the cooling loop 420 and the fuel in the engine-fuel unit 450.

In the illustrative embodiment, the method further includes varying a flow of fuel through the engine-fuel heat exchanger 479. The flow of fuel is varied through the engine-fuel heat exchanger 479 to deliver fuel to the engine 414 at the engine-fuel unit predetermined threshold temperature.

Figure 8:
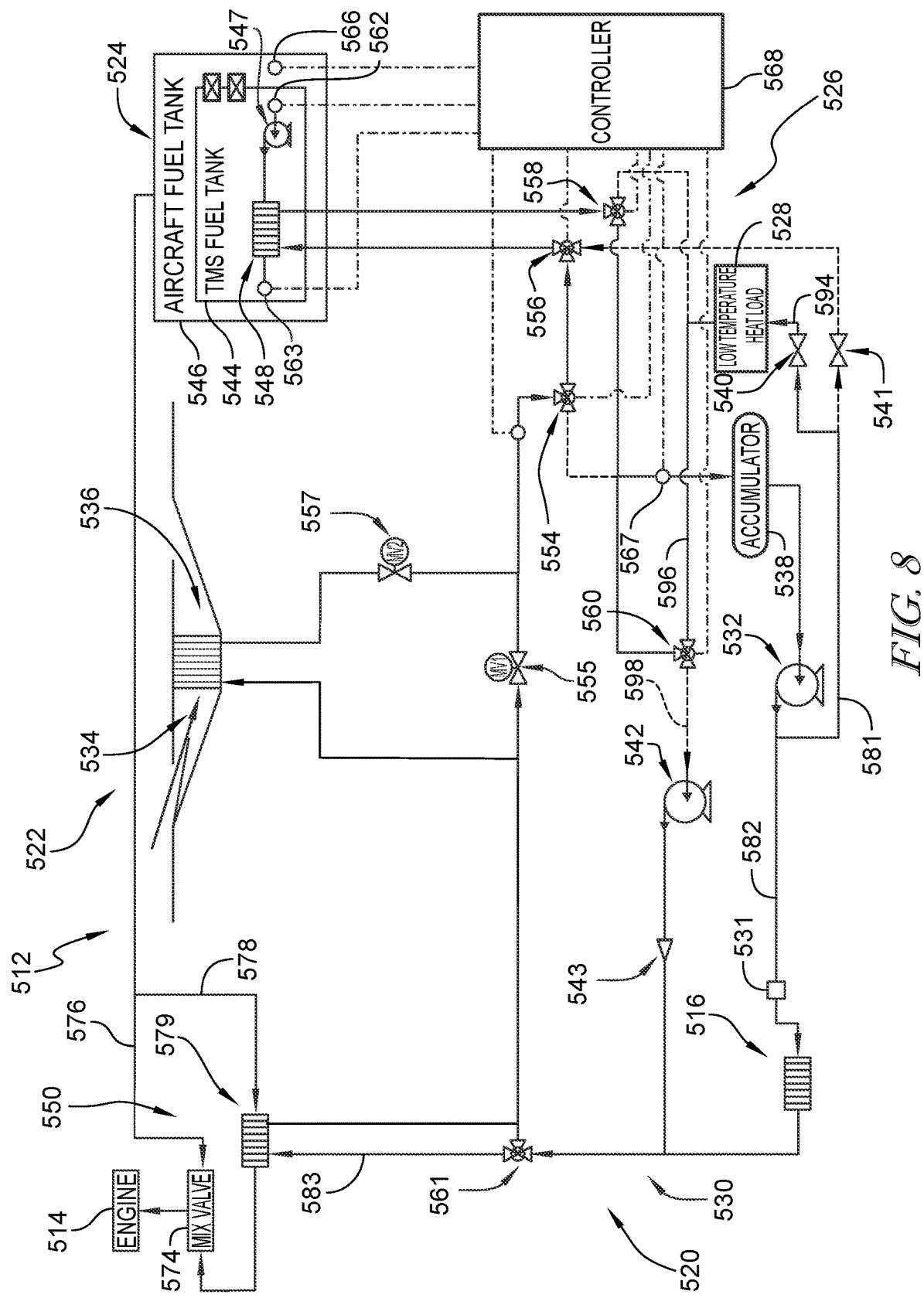
FIG. 8 is a diagrammatic view of another embodiment of a thermal energy system adapted for use in the aircraft of FIG. 1 showing the thermal energy system includes a cooling loop, a ram air cooler, a thermal-storage fuel system, and a valve connected to the fluid conduit and configured to selectively cause the flow of fluid to bypass a compressor downstream of a low temperature heat load in thermal communication with the fluid conduit for transferring heat to the fluid in the fluid conduit.

Another embodiment of a thermal energy system 512 in accordance with the present disclosure is shown in FIG. 8. The thermal energy system 512 is substantially similar to the thermal energy system 412 shown in FIGS. 6 and 7 and described herein. Accordingly, similar reference numbers in the 500 series indicate features that are common between the thermal energy system 512 and the thermal energy system 412. The description of the thermal energy system 412 is incorporated by reference to apply to the thermal energy system 512, except in instances when it conflicts with the specific description and the drawings of the thermal energy system 512.

The thermal energy system 512 includes a cooling loop 520, a cooler 522, a thermal-storage fuel system 524, a control system 526, a first heat source 516, and a second heat source 528 as shown in FIG. 8. The cooling loop 520 has a fluid conduit 530 and a pump 532 configured to move fluid through the fluid conduit 530 to transfer heat from the heat sources 516, 528 to the fluid in the fluid conduit 530 thereby cooling the heat sources 516, 528. The cooler 522 includes a duct 534 configured to receive air from the atmosphere 18 and an air-stream heat exchanger 536 located in the duct 534 to transfer heat between the fluid in the cooling loop 520 and the air passing through the duct 534. The thermal-storage fuel system 524 is configured to transfer heat between the fluid in the cooling loop 520 and fuel stored in the thermal-storage fuel system 524.

The control system 526 is configured to control the flow of fluid through the fluid conduit 530.

The control system 526 includes a plurality of valves 554, 555, 556, 557, 558, 560, 561, sensors 562, 563, 564, 566, 567, and a controller 568 as shown in FIG. 8. The valves 554, 555, 556, 557, 558, 560, 561 are connected to the fluid conduit 530 and configured to selectively control the flow of fluid through the cooling loop 520. The sensors 562, 563, 564, 566, 567 are configured to measure the temperature of the fuel in the fuel tanks 544, 546 and the temperature of the fluid in the fluid conduit 530. The controller 568 is configured to operate the plurality of valves 554, 555, 556, 557, 558, 560, 561 to allow the fluid to flow through the fluid conduit 530 based at least in part on the information measured by the sensors 562, 563, 564, 566, 567.

The controller 568 is configured to manage the cooling of the heat loads 516 as well as the use of the thermal-storage fuel system 524. The controller 568 is configured to direct the valves 554, 555, 556, 557, 558, 560, 561 to vary the flow of the fluid in the cooling loop 520. The controller 568 is also configured to control the fuel pump flow rate of the fuel pump 547 included in the thermal-storage fuel system 524 through the fuel-tank heat exchanger 548. The controller 568 controls the valves 554, 555, 556, 557, 560, 561 and the fuel pump 547 so as to maintain the fluid in the cooling loop 520 at a predetermined temperature.

The plurality of valves 554, 555, 556, 557, 558, 560, 561 includes a first valve 554, a second valve 556, a third valve 558, a fourth valve 560, a fifth valve 561, and the modulating valves 555, 557 as shown in FIG. 8. The first valve 554 is connected to the fluid conduit 530 downstream of the air-stream heat exchanger 536 so as to selectively cause the flow of fluid to bypass the fuel-tank heat exchanger 548. The second valve 556 is connected to the fluid conduit 530 downstream of the first valve 554 and an expansion valve 541 included in the cooling loop 520 so as to selectively control the flow of fluid through the fuel-tank heat exchanger 548. The third valve 558 is connected to the fluid conduit 530 downstream of the fuel-tank heat exchanger 548 so as to selectively control the flow of fluid to the compressor 542 or back to the accumulator 538. The fourth valve 560 is connected to the fluid conduit 530 upstream of a compressor 542 connected to the fluid conduit 530 so as to selectively control the flow of fluid through the compressor 542. The fifth valve 561 is connected to the fluid conduit 530 upstream of an engine-fuel unit 550 included in the system 524 to vary the flow through the engine-fuel unit 550. The valves 555, 557 are configured to vary the flow rate of the fluid in the cooling loop 520 through the air-stream heat exchanger 536.

The control system 526 is configured to selectively vary a flow of the fluid in the cooling loop 520 through the air-stream heat exchanger 536 and the fuel-tank heat exchanger 548 to maintain a temperature of the high temperature heat source 516 below a predetermined heat load temperature.

In some embodiments, the controller 568 may be configured to determine an amount of heat transfer to the fuel in the first fuel tank 544 and operate the plurality of valves 554, 555, 556, 557, 558 to selectively vary the flow of fluid in the cooling loop 520 through the air-stream heat exchanger 536 and the fuel-tank heat exchanger 548 in response to the amount of heat transfer being different from a predetermined heat rejection schedule.

In some embodiments, the controller 568 is configured to determine a temperature of the fluid in the cooling loop 520 upstream of the accumulator 538 included in the cooling loop 520. The controller 568 may operate the valves, 555, 557 to vary the flow of fluid in the cooling loop 520 through the air-stream heat exchanger 536 in response to the temperature of the fluid in the cooling loop 520 upstream of the accumulator 538 measured by the sensor 567 being different than a sensor target temperature.

In the illustrative embodiment, the second expansion valve 541 is arranged upstream of the thermal-storage fuel system 524. The compressor 542 is arranged downstream of the low temperature heat loads 528. In the illustrative embodiment, the expansion valves 540, 541 may act as control valves to control the flow of the fluid across the low temperature heat loads 528. In other embodiments, the expansion valves 540, 541, in conjunction with the compressor 542, may be configured to reduce the pressure of the fluid in the cooling loop 520 between the expansion valves 540, 541 and the compressor 542.

The thermal-storage fuel system 524 further includes the engine-fuel unit 550 as shown in FIG. 8. Both the first fuel tank 544 and second fuel tank 546 are configured to store fuel therein. The engine-fuel unit 550 is configured to receive fuel from the second fuel tank 546 and deliver the fuel to the engine 514. In the illustrative embodiment, the engine-fuel unit 550 is in thermal communication with the cooling loop 520 to transfer heat between the fluid in the cooling loop 520 and the fuel in the engine-fuel unit 550.

The engine-fuel unit 550 includes a mix valve 574, conduits 576, 578, and an engine-fuel heat exchanger 579 as shown in FIG. 8. The first conduit 576 is in fluid communication between the mix valve 574 and the second fuel tank 546 to deliver fuel having a first temperature to the mix valve 574. The second conduit 578 is in fluid communication between the mix valve 574 and the second fuel tank 546. The engine-fuel heat exchanger 579 in thermal communication with the second conduit 578 to cause the second conduit 578 to deliver fuel having a second temperature to the mix valve 574.

In the illustrative embodiment, the controller 568 is configured to operate the plurality of valves 554, 555, 556, 557, 558, 560, 561 to control the fluid to flow through the fuel-tank heat exchanger 548, the engine-fuel unit 550, and the compressor 542 based on inputs form the control system 526. Similar to the embodiments of FIGS. 6 and 7, the plurality of valves 554, 556, 558 allow fluid to flow through the fuel-tank heat exchanger 548 if the controller 568 receives the appropriate signals. In the illustrative embodiment, the controller 568 is also configured operate the fourth valve 560 to control the fluid through the compressor 542 based on inputs from the control system 526.

During use of the thermal energy system 512 in the aircraft 10, the fluid in the fluid conduit 530 is pumped from an accumulator 538 included in the cooling loop 520 to the heat source 516 as indicted by arrow 582 and to the expansion valves 540, 541 as indicated by arrow 581 in FIG. 8. The pump 532 moves the fluid through the fluid conduit 530 to transfer heat from the heat source 516 to the fluid to cool the heat source 516. The pump 532 also moves the fluid through the expansion valve 540 to expand the fluid such that the fluid has a relatively low temperature compared the low temperature heat loads 528.

As the fluid exits the expansion valve 540, the fluid in the fluid conduit 530 moves across the low temperature heat loads 528 as indicated by arrow 594 as shown in FIG. 8. As the fluid moves across the low temperature heat loads 528, the low temperature heat loads 528 transfer heat to the fluid to cause the fluid to be a vapor. The vapor than flows to the compressor 542 as indicated by arrow 596. The compressor 542 compresses the vapor in the fluid conduit 530 to be cooled by the thermal-storage fuel system 524 or the engine-fuel heat exchanger 579 and/or the air-stream heat exchanger 536 in some embodiments.

However, on colder days, thermal lift may not be needed, as the air temperature may be low enough to sufficiently cool the low temperature heat loads 528. In this case, the accumulator 538 may be operated at a lower temperature without the need of the compressor 542 to lower the pressure and temperature in the low temperature heat loads 528. As such, the expansion valve 540 may operate as flow control valves and the fluid passing through the low temperature heat loads 528 may be vaporized. The resulting vaporized or partially vaporized fluid may then bypass the compressor 542 as indicated by the dotted arrow 598 as shown in FIG. 8, which indicates no fluid flow through the compressor 542.

In some embodiments, the valve 560 may be eliminated and the fluid may be passed through the compressor 542 that is not running. However, the valve 560 may be included in the event that stopping the compressor 542 would not permit the flow of fluid through the compressor 542. Furthermore, a check valve 543 may be added downstream of the compressor 542, to prevent liquid from entering the compressor 542 when the compressor 542 is not in operation.

Instead, the controller 568 is configured to direct the valve 560 to direct the vaporized or partially vaporized fluid back to the accumulator 538. The valve 560 therefore blocks the flow of fluid to the compressor 542 as indicated by the dotted arrow 598.

In the illustrative embodiment, the cooling loop 520 further includes an orifice 531 as shown in FIG. 8. The orifice 531 is connected to the fluid conduit 530 upstream of the heat source 516 to increase the pump exit pressure of the pump 532. Increasing the pump exit pressure forces the flow through the low temperature heat loads 528. Depending on the pressure drops through the various components 516, 548, 528, etc., the orifice 531 may be removed. In some embodiments, the controller 568 may be configured to control the orifice 531.

Figure 9:
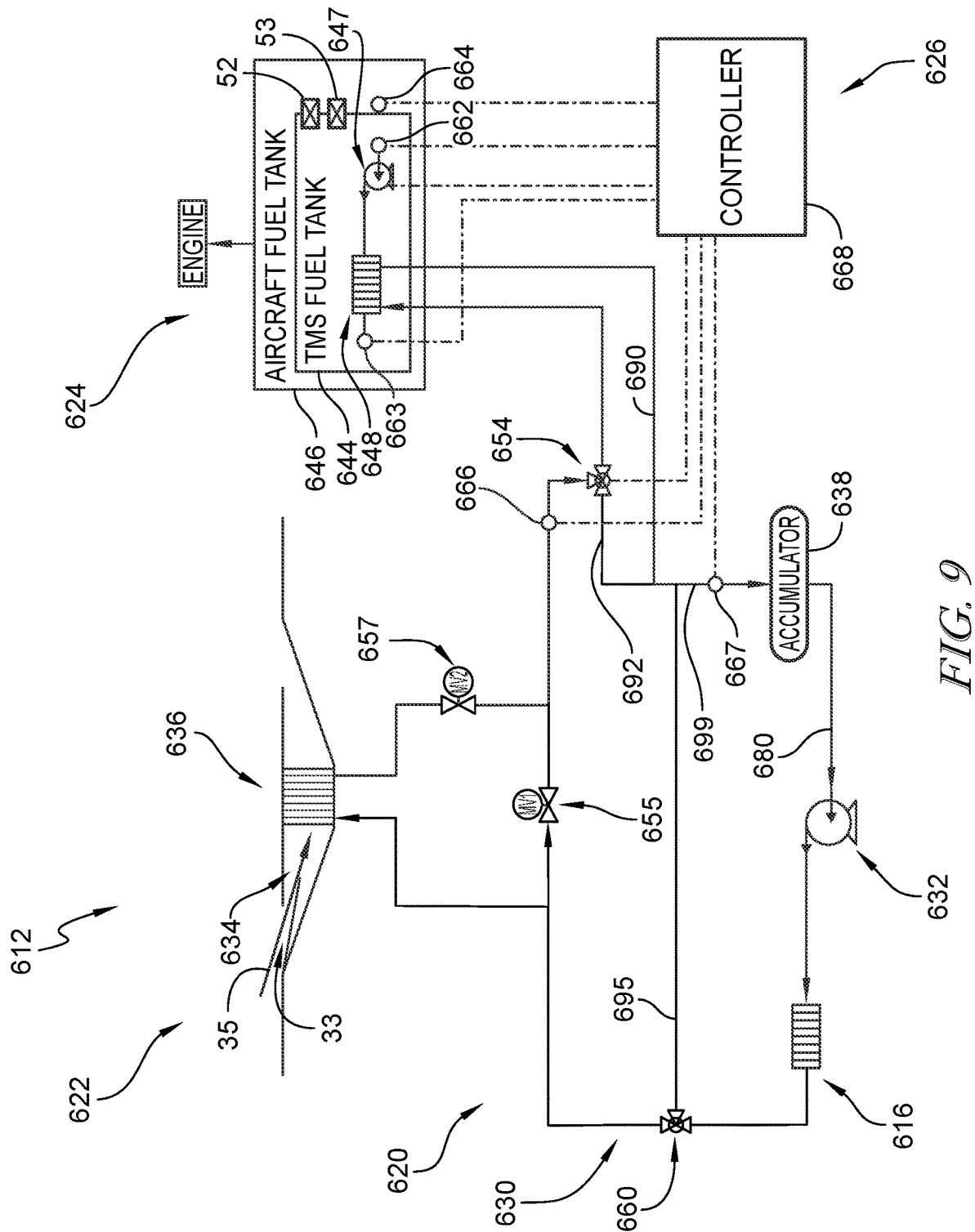
FIG. 9 is a diagrammatic view of another embodiment of a thermal energy system adapted for use in the aircraft of FIG. 1 showing the thermal energy system includes a cooling loop, a ram air cooler, a thermal-storage fuel system, and a bypass valve connected to the fluid conduit and configured to selectively cause at least a portion of the flow of fluid to bypass the ram air cooler and the thermal-storage fuel system.

Another embodiment of a thermal energy system 612 in accordance with the present disclosure is shown in FIG. 9. The thermal energy system 612 is substantially similar to the thermal energy system 12 shown in FIGS. 1-3 and described herein. Accordingly, similar reference numbers in the 600 series indicate features that are common between the thermal energy system 612 and the thermal energy system 12. The description of the thermal energy system 12 is incorporated by reference to apply to the thermal energy system 612, except in instances when it conflicts with the specific description and the drawings of the thermal energy system 612.

The thermal energy system 612 includes a cooling loop 620, a cooler 622, a thermal-storage fuel system 624, and a control system 626 as shown in FIG. 9. The cooling loop 620 has a fluid conduit 630 and a pump 632 configured to move fluid through the fluid conduit 630 to transfer heat from the heat source 616 to the fluid thereby cooling the heat source 616. The cooler 622 includes a duct 634 configured to conduct air therethrough and an air-stream heat exchanger 636 located in the duct 634. The air-stream heat exchanger 636 is in thermal communication with the fluid conduit 630 to transfer heat between the fluid in the cooling loop 620 and the air passing through the duct 634. The thermal-storage fuel system 624 is configured to transfer heat between the fluid in the cooling loop 620 and fuel stored in the thermal-storage fuel system 624. The control system 626 is configured to control the flow of fluid through the cooling loop 620 to manage the cooling of the heat loads 616 as well as manage the use of the thermal-storage fuel system 624.

The thermal-storage fuel system 624 includes a first fuel tank 644, a second fuel tank 646, and a fuel-tank heat exchanger 648 as shown in FIG. 9. Both the first fuel tank 644 and second fuel tank 646 are configured to store fuel therein. The second fuel tank 646 is in fluid communication with the first fuel tank 644 and configured to transfer fuel therebetween. The fuel-tank heat exchanger 648 is in thermal communication with the fluid conduit 630 and is configured to transfer heat between the fluid in the cooling loop 620 and fuel stored in the first fuel tank 644. In the illustrative embodiment, the thermal-storage fuel system 624 includes a fuel pump 647 configured to pump fuel through the fuel-tank heat exchanger 648.

The control system 626 is configured to manage the temperature of the heat load 616 so that the heat load 616 does not exceed threshold temperatures, i.e. a predetermined heat load temperature. In some embodiments, the heat load 616 may comprise of multiple heat loads 616 that may be arranged in series, parallel, or a combination. The control system 626 is also configured to manage the flow of fluid in the cooling loop 620 so that cooling of the heat load 616 is provided in the most efficient way. In other words, the control system 626 is configured to manage the flow of fluid so as to minimize the fuel burned to complete the flight cycle. The thermal-storage fuel system 624 adds the capability to reduce the amount of heat rejected to the environment and to determine the most efficient time to reject the heat to the environment.

The control system 626 includes a plurality of valves 654, 655, 657, 660, sensors 662, 663, 664, 666, 667, and a controller 668 as shown in FIG. 9. The valves 654, 655, 657, 660 are connected to the fluid conduit 630 and configured to selectively control the flow of fluid through the cooling loop 620. The sensors 662, 663, 664, 666, 667 are configured to measure the temperature of the fuel in the fuel tanks 644, 646 and the temperature of the fluid in the fluid conduit 630 of the cooling loop 620. The controller 668 is configured to operate the plurality of valves 654, 655, 657, 660 to allow the fluid to flow through the fluid conduit 630 based at least in part on the information measured by the sensors 662, 663, 664, 666, 667.

The plurality of valves 654, 655, 657, 660 includes a first valve 654, modulating valves 655, 657, and a bypass valve 660 as shown in FIG. 9. The first valve 654 is connected to the fluid conduit 630 downstream of the air-stream heat exchanger 636 so as to selectively cause the flow of fluid to bypass the fuel-tank heat exchanger 648. The valves 655, 657 are configured to vary the flow rate of the fluid in the cooling loop 620 through the air-stream heat exchanger 636. The bypass valve 660 is connected to the fluid conduit 630 upstream of the air-stream heat exchanger 636 and downstream of the pump 632 connected to the fluid conduit 630 and the heat source 616 to control the flow of fluid back toward an accumulator 638 included in the cooling loop 620.

The controller 668 is configured to manage the cooling of the heat loads 616 as well as the use of the thermal-storage fuel system 624. The controller 668 is configured to direct the valves 654, 655, 657, 660 to vary the flow of the fluid in the cooling loop 620. The controller 668 is also configured to control the fuel pump flow rate by the fuel pump 647 included in the thermal-storage fuel system 624 through the fuel-tank heat exchanger 648. The controller 668 controls the valves 654, 655, 657, 660 and the fuel pump 647 so as to maintain the fluid in the cooling loop 620 at a predetermined temperature.

The bypass valve 660 may vary the flow of fluid through line 695 back to the accumulator 638 to mix the flow of fluid with the fluid in line 699 as shown in FIG. 9. The lines 690, 692 are in fluid communication with line 699 which leads back to the accumulator 638. The flow of fluid from the air-stream heat exchanger 636 in line 692 and the flow of fluid from the fuel-tank heat exchanger 648 flow into line 699 as shown in FIG. 9.

In some operating conditions, one of the lines 690, 692 will have no flow or zero flow. The bypass valve 660 is configured to selectively cause only a portion of the fluid to flow back to the accumulator 638 in some instances. At other times, the bypass valve 660 is configured to cause nearly all of the flow of fluid to flow back to the accumulator 638. In other cases, the bypass valve 660 is configured to block the flow of fluid back to the accumulator 638 causing the flow of fluid to flow toward the air-stream heat exchanger 636.

The flow of fluid back to the accumulator 638 should be at a desired state to be able to achieve a desired accumulator temperature. The sensor 667 is configured to measure the temperature of the fluid returning to the accumulator 638 in line 699 to determine if the temperature matches a sensor target temperature equal to the desired accumulator temperature.

Without the bypass valve 660 and the bypass line 695, if the fuel in the fuel tank 644 is being cooled, the temperature of the fuel tank may never be colder than the desired temperature of the accumulator 638. The bypass valve 660 and the bypass line 695 allow the fluid from the fuel tank 644 to be equal to or less than the desired accumulator temperature, because a portion of the fluid in the cooling loop 620 may be transferred across the bypass line 695 and mixed with the cold fluid in line 699. In this way, the fuel tank 644 may be operated at a lower temperature and provide more thermal storage capability.

The bypass valve 660 allows the fuel in the fuel tank 644 to be cooled down to the ambient air temperature without using a compressor. Cooling the fuel in the fuel tank 644 without the compressor may be more efficient. The controller 668 may be configured to control flow of fluid through the valves 654, 655, 657, 660 to achieve the sensor target temperature at the sensor 667 like in the other embodiments discussed herein. The controller 668 is also configured to control the valves 654, 655, 657, 660 based on the measurements from the other sensors 662, 663, 664, 666, 667 like in the other embodiments discussed herein.

Figure 10:
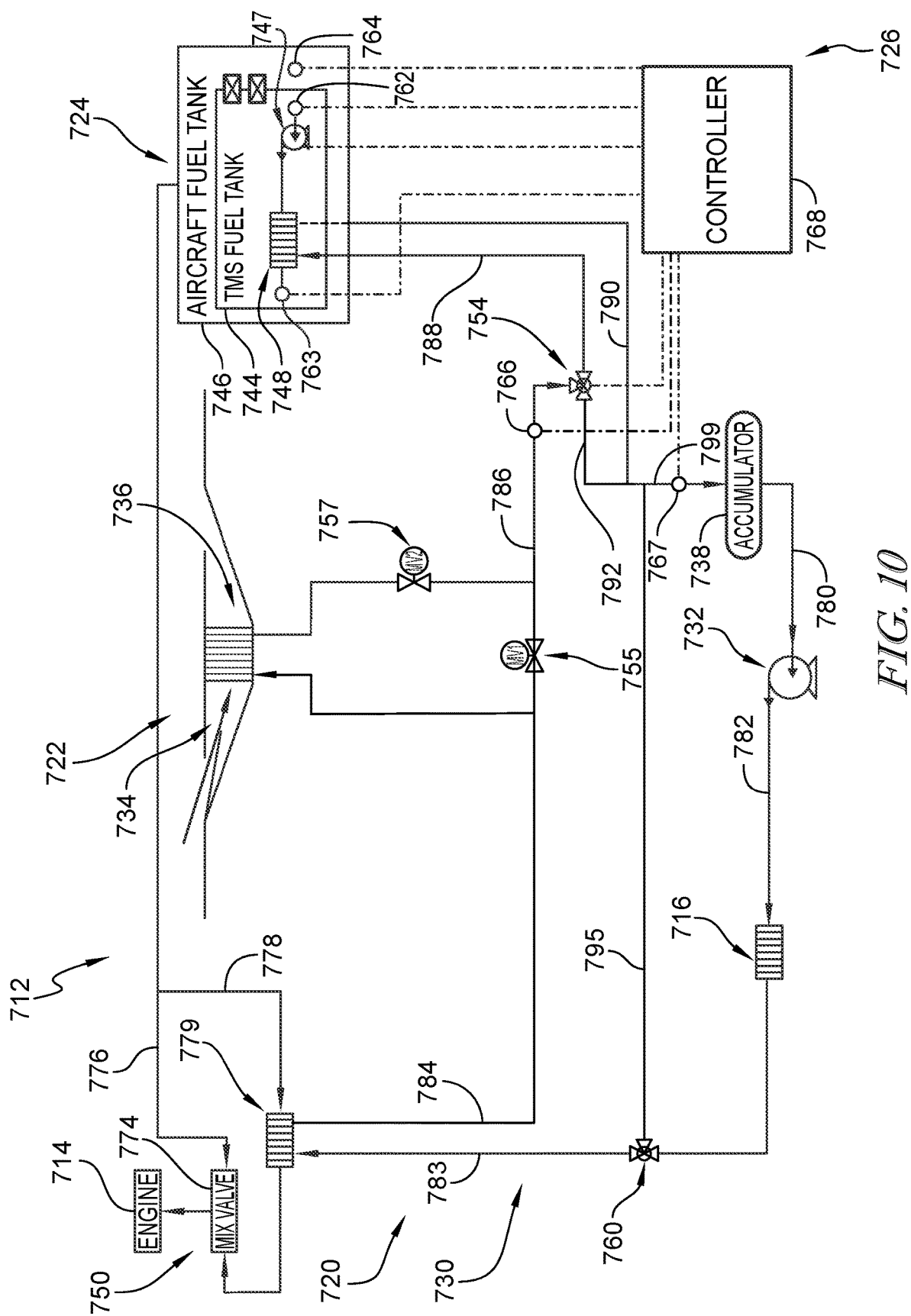
FIG. 10 is a diagrammatic view of another embodiment of a thermal energy system adapted for use in the aircraft of FIG. 1 showing the thermal energy system includes a cooling loop, a ram air cooler, a thermal-storage fuel system, and a bypass valve connected to the fluid conduit and configured to selectively cause at least a portion of the flow of fluid to bypass the ram air cooler, the thermal-storage fuel system, and an engine-fuel unit in thermal communication with the fuel stored in a second fuel tank.

Another embodiment of a thermal energy system 712 in accordance with the present disclosure is shown in FIG. 10. The thermal energy system 712 is substantially similar to the thermal energy system 212 shown in FIGS. 4 and 5 and described herein. Accordingly, similar reference numbers in the 700 series indicate features that are common between the thermal energy system 712 and the thermal energy system 212. The description of the thermal energy system 212 is incorporated by reference to apply to the thermal energy system 712, except in instances when it conflicts with the specific description and the drawings of the thermal energy system 712.

The thermal energy system 712 includes a cooling loop 720, a cooler 722, a thermal-storage fuel system 724, and a control system 726 as shown in FIG. 10. The cooling loop 720 has a fluid conduit 730 and a pump 732 configured to move fluid through the fluid conduit 730 to transfer heat from the heat source 716 to the fluid thereby cooling the heat source 716. The cooler 722 includes a duct 734 configured to conduct air therethrough and an air-stream heat exchanger 736 located in the duct 734. The air-stream heat exchanger 736 is in thermal communication with the fluid conduit 730 to transfer heat between the fluid in the cooling loop 720 and the air passing through the duct 734. The thermal-storage fuel system 724 is configured to transfer heat between the fluid in the cooling loop 720 and fuel stored in the thermal-storage fuel system 724. The control system 726 is configured to control the flow of fluid through the cooling loop 720 to manage the cooling of the heat loads 716 as well as manage the use of the thermal-storage fuel system 724.

The thermal-storage fuel system 724 includes fuel tanks 744, 746, a fuel-tank heat exchanger 748, and an engine-fuel unit 750 as shown in FIG. 10. Both the first fuel tank 744 and second fuel tank 746 are configured to store fuel therein, while the second fuel tank 746 is in fluid communication with the first fuel tank 744. The fuel-tank heat exchanger 748 is in thermal communication with the fluid conduit 730 and is configured to transfer heat between the fluid in the cooling loop 720 and fuel stored in the first fuel tank 744. The engine-fuel unit 750 is configured to receive fuel from the second fuel tank 746 and deliver the fuel to the engine 714. In the illustrative embodiment, the engine-fuel unit 750 is in thermal communication with the cooling loop 720 to transfer heat between the fluid in the cooling loop 720 and the fuel in the engine-fuel unit 750.

The engine-fuel unit 750 includes valve system having a mix valve 774, conduits 776, 778, and an engine-fuel heat exchanger 779 as shown in FIG. 4. The first conduit 776 is in fluid communication between the mix valve 774 and the second fuel tank 746 to deliver fuel having a first temperature to the mix valve 774. The second conduit 778 is in fluid communication between the mix valve 774 and the second fuel tank 746. The engine-fuel heat exchanger 779 in thermal communication with the second conduit 778 to cause the second conduit 778 to deliver fuel having a second temperature to the mix valve 774.

The valve system, including the mix valve 774 and the conduits 776, 778, is configured to vary a flow of fuel through the engine-fuel heat exchanger 779 to deliver fuel to the engine 714 at an engine-fuel unit predetermined threshold temperature. The control of the mix valve 774 is similar to the other embodiments as discussed previously.

Turning again to the control system 726, the control system 726 includes the valves 754, 755, 757, 760, sensors 762, 763, 764, 766, 767, and a controller 768 as shown in FIG. 10. The valve 754 is connected to the fluid conduit 730 and configured to selectively cause a flow of fluid to bypass the fuel-tank heat exchanger 748. The valves 755, 757 are connected to the fluid conduit 730 and configured to selectively vary the flow through the heat exchanger 736. The bypass valve 760 is connected to the fluid conduit 730 upstream of the engine-fuel heat exchanger 779 and downstream of the pump 732 and the heat source 716 to control the flow of fluid back toward an accumulator 738 included in the cooling loop 720.

The sensor 762 is configured to measure the temperature of the fuel at the inlet of a fuel pump 747, while the sensor 763 is configured to measure the temperature of the fuel at the outlet of the fuel pump 747. The sensor 764 is configured to measure the temperature of the fluid in the fuel tank 746. The sensor 766 is configured to measure the temperature of the fluid in the cooling loop 770 directly upstream of the fuel-tank heat exchanger 748 as it enters the fuel-tank heat exchanger 748. The sensor 767 is configured to measure the temperature of the fluid in the cooling loop 720 as it returns to an accumulator 738 included in the cooling loop 720.

The controller 768 is configured to manage the cooling of the heat loads 716 as well as the use of the thermal-storage fuel system 724. The controller 768 is configured to direct the valves 754, 755, 757, 760 to vary the flow of the fluid in the cooling loop 720. The controller 768 is also configured to control the fuel pump flow rate by the fuel pump 747 included in the thermal-storage fuel system 724 through the fuel-tank heat exchanger 748. The controller 768 controls the valves 754, 755, 757, 760 and the fuel pump 747 so as to maintain the fluid in the cooling loop 720 at a predetermined temperature.

The bypass valve 760 is configured to selectively vary the flow of fluid through a bypass line 795 back to the accumulator 738 to mix the flow of fluid with the fluid in line 799 as shown in FIG. 10. The lines 790, 792 are in fluid communication with line 799, which leads back to the accumulator 738. The flow of fluid from the air-stream heat exchanger 736 in line 792 and the flow of fluid from the fuel-tank heat exchanger 748 flow into line 799 as shown in FIG. 10.

The bypass valve 760 is configured to selectively vary the flow of fluid through a bypass line 795 back to the accumulator 738 so that a portion of the fluid in the cooling loop 720 bypasses the engine-fuel heat exchanger 779, the air-stream heat exchanger 736, and the fuel-tank heat exchanger 748. In some operating conditions, one of the lines 790, 792 will have no flow or zero flow. The bypass valve 760 is configured to selectively cause only a portion of the fluid flow to flow back to the accumulator 738 in some instances. At other times, the bypass valve 760 is configured to cause nearly all of the flow of fluid to flow back to the accumulator 738. In other cases, the bypass valve 760 is configured to block the flow of fluid back to the accumulator 738 causing the flow of fluid to flow toward the air-stream heat exchanger 736.

The flow of fluid in line 799 back to the accumulator 738 should be at a desired accumulator temperature. The sensor 767 is configured to measure the temperature of the fluid returning to the accumulator 738 to determine if the temperature matches a sensor target temperature equal to the desired accumulator temperature.

Without the bypass valve 760 and the bypass line 795, if the fuel in the fuel tank 744 is being cooled, the temperature of the fuel tank may never be colder than the desired temperature of the accumulator 738. The bypass valve 760 and the bypass line 795 allow the fluid from the fuel tank 744 to be equal to or less than the desired accumulator temperature, because a portion of the fluid in the cooling loop 720 may be transferred across the bypass line 795 and mixed with the cold fluid in 792 from the air-stream heat exchanger 736 and/or the fuel-tank heat exchanger 748. In this way, the fuel tank 744 may be operated at a lower temperature and provide more thermal storage capability.

The bypass valve 760 allows the fuel in the fuel tank 744 to be cooled down to the ambient air temperature without using a compressor. Cooling the fuel in the fuel tank 744 without the compressor may be more efficient. The controller 768 may be configured to control flow of fluid through the valves 754, 755, 757, 760 to achieve the sensor target temperature at the sensor 767 like in the other embodiments discussed herein. The controller 768 is also configured to control the valves 754, 755, 757, 760 and therefore control the flow of fluid in the cooling loop 720 based on the measurements from the other sensors 762, 763, 764, 766, 767 like in the other embodiments discussed herein.

Additionally, the controller 768 may also be configured to control the flow of fluid through the cooling loop 720 based on a heat rejection schedule like in the other embodiments discussed herein. Additionally, the controller 768 may also be configured to selectively vary the flow of the fluid in the cooling loop 720 through the engine-fuel heat exchanger 779, the air-stream heat exchanger 736, and/or the fuel-tank heat exchanger 748 to maintain a temperature of the heat source 716 below a predetermined heat load temperature. This includes directing the bypass valve 760 to vary the flow therethrough so that some or all of the fluid bypasses the engine-fuel heat exchanger 779, the air-stream heat exchanger 736, and the fuel-tank heat exchanger 748.

Figure 11:
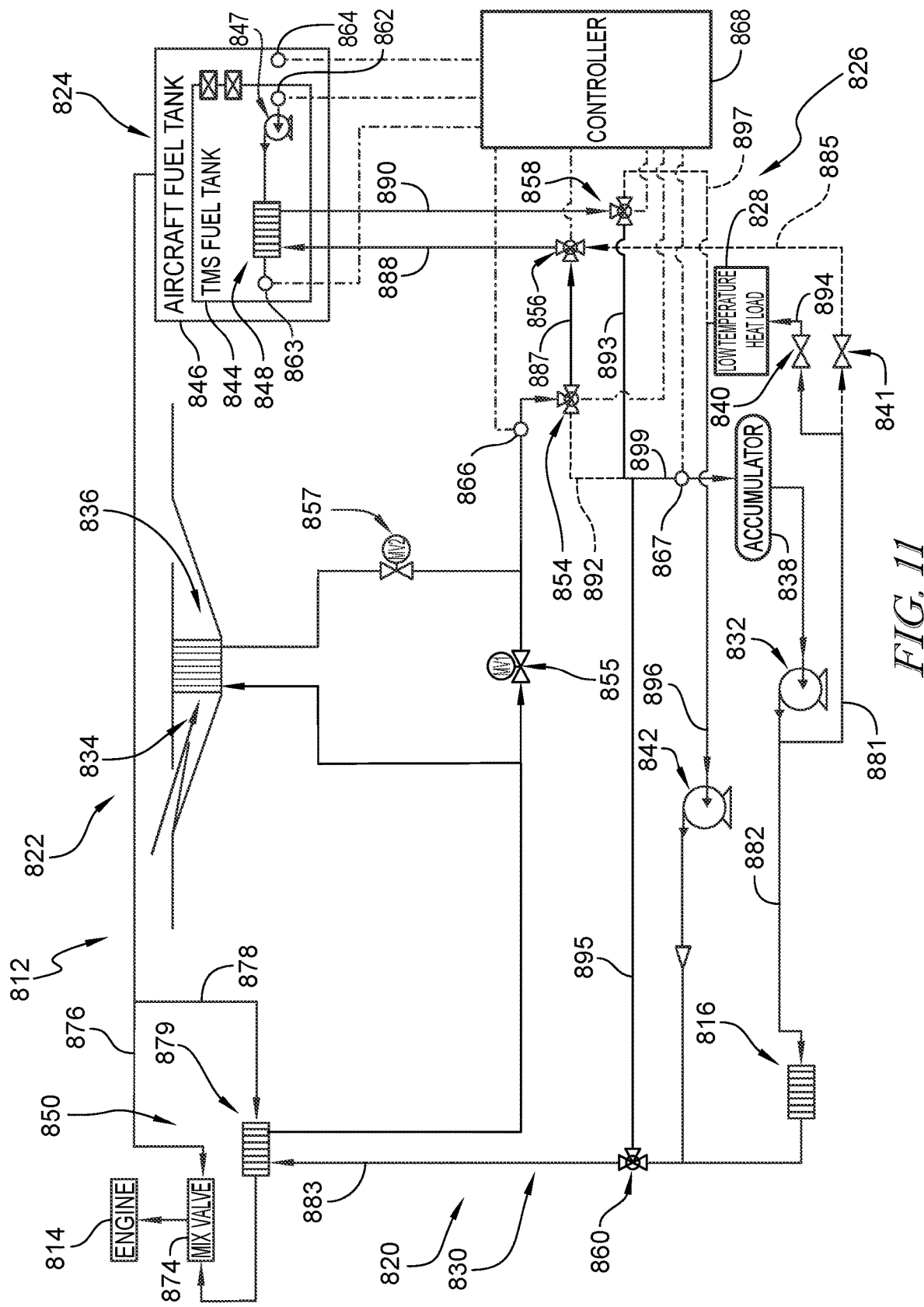
FIG. 11 is a diagrammatic view of another embodiment of a thermal energy system adapted for use in the aircraft of FIG. 1 showing the thermal energy system includes a cooling loop, a ram air cooler, and a thermal-storage fuel system, and further showing the thermal energy system includes a cooling loop, a ram air cooler, a thermal-storage fuel system, an engine-fuel unit, and a bypass valve, and further showing the cooling loop includes expansion valves connected to the fluid conduit to reduce the pressure of the fluid in the cooling loop and the bypass valve is connected to the fluid conduit downstream of the heat sources and configured to selectively cause at least a portion of the flow of fluid to bypass the ram air cooler, the thermal-storage fuel system, and the engine-fuel unit.

Another embodiment of a thermal energy system 812 in accordance with the present disclosure is shown in FIG. 11. The thermal energy system 812 is substantially similar to the thermal energy system 412 shown in FIGS. 6 and 7 and described herein. Accordingly, similar reference numbers in the 800 series indicate features that are common between the thermal energy system 812 and the thermal energy system 412. The description of the thermal energy system 412 is incorporated by reference to apply to the thermal energy system 812, except in instances when it conflicts with the specific description and the drawings of the thermal energy system 812.

The thermal energy system 812 includes a cooling loop 820, a cooler 822, a thermal-storage fuel system 824, a control system 826, a first heat source 816, and a second heat source 828 as shown in FIG. 11. The cooling loop 820 has a fluid conduit 830 and a pump 832 configured to move fluid through the fluid conduit 830 to transfer heat from the heat sources 816, 828 to the fluid in the fluid conduit 830 thereby cooling the heat sources 816, 828. The cooler 822 includes a duct 834 configured to receive air from the atmosphere 18 and an air-stream heat exchanger 836 located in the duct 834 to transfer heat between the fluid in the cooling loop 820 and the air passing through the duct 834. The thermal-storage fuel system 824 is configured to transfer heat between the fluid in the cooling loop 820 and fuel stored in the thermal-storage fuel system 824. The control system 826 is configured to control the flow of fluid through the fluid conduit 830.

The cooling loop 820 is structured to conduct the fluid heated from the first heat source 816 and the second heat source 828 first through an engine-fuel heat exchanger 879. Then the fluid in the cooling loop 820 is conducted through the air-stream heat exchanger 836 after the engine-fuel heat exchanger 879. Then the fluid in the cooling loop 820 is conducted through a fuel-tank heat exchanger 848 after the air-stream heat exchanger 836. In the illustrative embodiment, a bypass line 895 that conducts the fluid to bypass the engine-fuel heat exchanger 879, the air-stream heat exchanger 836, and the fuel-tank heat exchanger 848 to return the fluid back to an accumulator 838 included in the cooling loop 820. A bypass valve 860 is connected to the fluid conduit 830 upstream of the engine-fuel heat exchanger 879 and configured to selectively pass at least some of the fluid through the bypass line 895 so as to bypass the engine-fuel heat exchanger 879, the air-stream heat exchanger 836, and the fuel-tank heat exchanger 848.

The bypass valve 860 may vary the flow of fluid through line 895 back to the accumulator 838 to mix the flow of fluid with the fluid in line 899 as shown in FIG. 11. The lines 892, 893 are in fluid communication with line 899, which leads back to the accumulator 838.

In the illustrative embodiment, the cooling loop 820 further includes a plurality of expansion valves 840, 841 and a compressor 842. The first expansion valve 840 is arranged upstream of the second heat source 828. The second expansion valve 841 is arranged upstream of the thermal-storage fuel system 824. The compressor 842 is arranged downstream of the second heat source 828.

The expansion valves 840, 841, in conjunction with the compressor 842, are configured to reduce the pressure of the fluid in the cooling loop 820 between the expansion valves 840, 841 and the compressor 842. By reducing the pressure of the fluid, the temperature is lowered, which allows the fluid to effectively absorb heat. The vapor than flows to the compressor 842, which compresses the vapor in the fluid conduit 830 to the pressure that is in the conduit 830, and in the process increases the fluid's temperature, in order for the fluid to be cooled by the engine-fuel heat exchanger 879, the fuel-tank heat exchanger 848, and/or the air-stream heat exchanger 836.

However, in some embodiments, the air flowing through the air-stream heat exchanger 836 may be sufficiently cold enough that it may be more efficient to not use expansion valve 841. Rather, the fluid from the air-stream heat exchanger 836 in line 887, which has been cooled to a temperature below the temperature of the accumulator 838, may be used instead. Then, after returning from the fuel-tank heat exchanger 848, the fluid in line 899 may then be heated by the fluid in line 895.

In the illustrative embodiment, the fluid from the compressor 842 mixes with the flow from the first heat source 816 and then the combined streams flow to the bypass valve 860. The bypass valve 860 is configured to selectively cause at least a portion of the fluid to flow back to the accumulator 838 in some instances. At other times, the bypass valve 860 is configured to cause nearly all of the flow of fluid to flow back to the accumulator 838. In other cases, the bypass valve 860 is configured to block the flow of fluid to flow back to the accumulator 838 causing the flow of fluid to flow toward the air-stream heat exchanger 836.

The fluid directed back to the accumulator 838 should be at a desired state to be able to achieve a desired accumulator temperature. The bypass valve 860 and the bypass line 895 allow the fluid from the fuel tank 844 to be equal to or less than the desired accumulator temperature, because a portion of the fluid in the cooling loop 820 may be transferred across the bypass line 895 and mixed with the cold fluid in 899. In this way, the fuel tank 844 may be operated at a lower temperature and provide more thermal storage capability. The fluid directed back to through the bypass line 895 to the accumulator 838 is mixed with the fluid in line 899 so as to meet the sensor target temperature measured by sensor 867.

The controller 868 may be configured to control flow of fluid through the valves 854, 855, 857, 860 to achieve the sensor target temperature at the sensor 867 like in the other embodiments discussed herein. The controller 868 is also configured to control the valves 854, 855, 857, 860 and therefore control the flow of fluid in the cooling loop 820 based on the measurements from the other sensors 862, 863, 864, 866, 867 like in the other embodiments discussed herein.

Additionally, the controller 868 may also be configured to control the flow of fluid through the cooling loop 820 based on a heat rejection schedule like in the other embodiments discussed herein. Additionally, the controller 868 may also be configured to selectively vary the flow of the fluid in the cooling loop 820 through the engine-fuel heat exchanger 879, the air-stream heat exchanger 836, and/or the fuel-tank heat exchanger 848 to maintain a temperature of the heat source 816 below a predetermined heat load temperature. This includes directing the bypass valve 860 to vary the flow therethrough so that some or all of the fluid bypasses the engine-fuel heat exchanger 879, the air-stream heat exchanger 836, and the fuel-tank heat exchanger 848.

The present disclosure relates to an aircraft 10 with a thermal energy system 12 to cool low temperature heat loads of the electrical components or other engine or aircraft oil/hydraulic heat loads. Hybrid electric thermal energy systems may rely on ram-air heat exchangers for rejecting the waste heat produced by power electronic devices or electric machines such as generators and motors.

In the illustrative embodiments, the gas turbine engine 14 is mounted to the outside of the aircraft 10. In other embodiments, the gas turbine engine 14, 214, 314, 414, 514, 614, 714, 814 may be inside of the aircraft 10. The engine 14, 214, 314, 414, 514, 614, 714, 814 may be in the fuselage where electric power is produced. This electric power may then be transferred to an electric fan. The electric fan may be in other parts of the aircraft 10, such as the tail, or there may be electric fans distributed on the wings of the aircraft 10.

The thermal energy system 12 may use single-phase liquid coolants or two-phase coolants. For two-phase coolants, the cooling loop 20, 220, 320, 420, 520, 620, 720, 820 may represent a two-phase pump loop (TPPL). The use of the ram air may be driven by the low temperature requirements of the devices being cooled. This low temperature difference between the component being cooled and the ram air temperature causes several challenges. In other embodiments, a fan stream duct may be used.

The controller 68, 268, 468, 568 may be configured to direct the valves 54, 254, 454, 456, 458, 554, 556, 558 to selectively control the flow of fluid in the cooling loop 20, 220, 420, 520 through the fuel-tank heat exchanger 48, 248, 448, 548 to maximize fuel savings of the aircraft 10 based on the type of day (i.e. hot day or cold day). The controller 68, 268, 468, 568 may direct the valves 54, 254, 454, 456, 458, 554, 556, 558 based on the temperature along the flight path, while keeping the high temperature heat sources 16, 216, 316, 416, 516 and/or fuel below a predetermined threshold.

The controller 668, 768, 868 may be configured to direct the valves 654, 655, 657, 660, 754, 755, 757, 760, 854, 855, 856, 857, 858, 860 to selectively control the flow of fluid in the cooling loop 620, 720, 820 to maximize fuel savings of the aircraft 10 based on the type of day (i.e. hot day or cold day). The controller 668, 768, 868 may direct the valves 654, 660, 754, 760, 854, 856, 858, 860 based on the temperature along the flight path, while keeping the high temperature heat sources 616, 716, 816 and/or fuel below a predetermined threshold.

First, when the aircraft 10 is sitting on the ground or taxiing, there is little to no ram pressure to force air through the air-stream heat exchanger 36 to cool the coolant. As such, a typical aircraft system may include a blower to force air through the heat rejection heat exchanger. The blower and additional ducting adds weight and volume to the thermal management system. The system of the present disclosure does not include a blower.

Second, the highest heat loads typically occur at take-off, when the ram air is quite close in temperature to the devices to be cooled. Therefore very large mass flow rates of air may be needed to carry the heat away. Furthermore, at start of take-off, the ram pressure is relatively low. The large airflow rates and low ram pressure rise may cause typical heat rejection heat exchangers and ram air ducts to be relatively large in size. The ducts and heat exchangers of the present disclosure may be small in size to reduce weight.

Conversely, at cruise altitude, the ram air temperature will have significantly decreased and the ram pressure difference on the heat exchanger will have increased. As a result, a much smaller heat exchanger could theoretically be used for this flight operating condition. However, because the heat rejection heat exchanger may have been sized for hot day take-off, the typical aircraft may experience a large drag penalty.

To eliminate the blower and reduce the size of the duct and heat rejection heat exchanger, the thermal energy system 12, 212, 312, 412, 512, 612, 712, 812 of the present disclosure includes a thermal-storage fuel system 24, 224, 324, 424, 524, 624, 724, 824 that increases the efficiency of the aircraft 10.

The thermal-storage fuel system 24, 224, 324, 424, 524, 624, 724, 824 enables a smaller ram air cooler 22, 222, 322, 422, 522, 622, 722, 822 and eliminates the blower. The thermal-storage fuel system 24, 224, 324, 424, 524, 624, 724, 824 uses the available on-board fuel as a heat sink for all or a portion of the electrical loads produced early in the mission while at low altitude (e.g. idle, taxi, take-off).

Then, at altitude, the heat stored in the thermal-storage fuel system 24, 224, 324, 424, 524, 624, 724, 824 may be rejected to the much colder ambient air. As a result, the air-stream heat exchanger 36, 236, 336, 436, 536, 636, 736, 836 and the duct 34, 234, 334, 434, 534, 634, 734, 834 may be sized for a condition that is not as challenging as the worst case condition of rejecting high heat loads to hot air temperatures with little ram pressure, resulting in smaller, lighter, and more efficient thermal system 12, 212, 312, 412, 512, 612, 712, 812.

The heat transferred to the fluid in the cooling loop 20, 220, 320, 420, 520, 620, 720, 820 is removed from the fluid using several different methods. In some embodiments, the engine-fuel unit 250, 350, 450, 550, 750, 850 rejects heat to the fuel that is being passed to the engine 214, 314, 414, 514, 714, 814 to be burned. In some embodiments, the ram-air heat rejection heat exchanger 36, 236, 336, 436, 536, 636, 736, 836 rejects heat to the air flowing through the duct 34, 234, 334, 434, 534, 634, 734, 834. In some embodiments, the thermal-storage fuel system 24, 224, 324, 424, 524, 624, 724, 824 stores the heat from the fluid in the fuel in the first fuel tank 44, 244, 344, 444, 544, 644, 744, 844. Any combination of these heat management features may be used.

Each of these heat rejection methods helps remove heat from the heat source 16, 216, 316, 416, 516, 616, 716, 816 out of the system 12, 212, 312, 412, 512, 612, 712, 812 at different points in the mission or during different flight conditions.

In some conventional thermal energy systems, the fuel is transferred from the tank, heated by the heat loads of the system, possibly cooled, and then returned to the tank. Moving the fuel around the system may be hazardous and cause safety issues.

In this disclosure, the thermal-storage fuel system 24, 224, 324, 424, 524, 624, 724, 824 keeps the fuel in close proximity to the respective fuel tank 44, 244, 344, 444, 544, 644, 744, 844 and eliminates the running of fuel around the aircraft 10, which reduces the risk of fire. In the illustrative embodiments of FIGS. 2-5, 9, 10, the system 12, 212, 312, 612, 712 uses a single-phase coolant (e.g. water based coolant, oil, etc.). However, in the embodiments of FIGS. 2-4, 9, and 10, the system 12, 212, 612, 712 may also use a two-phase coolant.

In the illustrative embodiments of FIGS. 6-8 and 11, the system 412, 512, 812 uses a two-phase coolant. In the case of two-phase coolant, the pumping power and pump size may also be decreased relative to the pumping of single phase coolant.

In the illustrative embodiments, the thermal-storage fuel system 24, 224, 324, 424, 524, 624, 724, 824 includes a dedicated thermal management system (TMS) tank 44, 244, 344, 444, 544, 644, 744, 824 configured to enable a portion of the fuel to be taken to a temperature higher than what the engine 14, 214, 314, 414, 514, 614, 714, 814 may safely receive. In this way, the fuel heat storage capacity is increased. The fuel may later be cooled to a lower temperature to be able to be safely supplied to the engine 14, 214, 314, 414, 514, 614, 714, 814 later in the mission.

In the illustrative embodiments, the fuel-tank heat exchanger 48, 248, 348, 448, 548, 648, 748, 848 is shown to be located in the TMS tank 44, 244, 344, 444, 544, 644, 744, 844. In other embodiments, the fuel-tank heat exchanger 48, 248, 348, 448, 548, 648, 748, 848 may be located adjacent to or outside of the TMS tank 44, 244, 344, 444, 544, 644, 744, 844. The fuel-tank heat exchanger 48, 248, 348, 448, 548, 648, 748, 848 may contact the outside of the TMS fuel tank 44, 244, 344, 444, 544, 644, 744, 844 in some embodiments.

In other embodiments, the fuel-tank heat exchanger 48, 248, 348, 448, 548, 648, 748, 848 is located adjacent to or in close proximity to the thermal-storage fuel system 24, 224, 324, 424, 524, 624, 724, 824. In other embodiments, the fuel-tank heat exchanger 48, 248, 348, 448, 548, 648, 748, 848 may be located in another suitable location and fluidly connected to the fluid conduit 30, 230, 330, 430, 530, 630, 730, 830 of the cooling loop 20, 220, 320, 420, 520, 620, 720, 820.

The thermal energy system 12, 212, 312, 412, 512, 612, 712, 812 extends a simple two-phase pump loop architecture to move and dissipate heat to various stations along the TPPL. The thermal-storage fuel system 24, 224, 324, 424, 524, 624, 724, 824 stores the heat load on board and the air-stream heat exchanger 36, 236, 336, 436, 536, 636, 736, 836 dissipates the heat to air when it can be done more efficiently. This reduces the size and drag of the condenser on the aircraft 10.

In the illustrative embodiments of FIGS. 6-8 and 11, the thermal energy system 412, 512, 812 further includes a compressor 442, 542, 842 to enable cooling the low temperature heat loads 428, 528, 828 to a lower temperature. The compressor 442, 542, 842 may provide the capability of cooling the low temperature heat loads on a hot day. The compressor 442, 542, 842 may also allow the other heat loads to operate at higher temperatures, thus making greater use of the thermal-storage fuel system 424, 524, 824. In other embodiments, the low temperature heat loads 428, 528, 828 may be another low temperature device, such as avionics, directed energy weapons, etc.

At the engine-fuel unit 250, 350, 450, 550, 750, 850 the coolant rejects heat to the fuel provided to the engine 214, 314, 414, 514, 714, 814 to be burned. In order to maximize the use of the fuel heat sink, the fuel entering the engine 214, 314, 414, 514, 714, 814 is increased in temperature to its maximum allowable value or maximum allowable fuel temperature.

To ensure the fuel provided to the engine 214, 314, 414, 514, 714, 814 is at the maximum allowable fuel temperature, the fuel stream is split prior to the engine-fuel heat exchanger 279, 479, 579, 779, 879 and only a portion of the fuel passes through the engine-fuel heat exchanger 279, 479, 579, 779, 879. A mix valve 274, 474, 574, 774, 874 configured to sense the temperature of the fuel exiting the mix valve 274, 474, 574, 774, 874 is used to manage the temperature of the fuel entering the engine 214, 414, 514, 714, 814.

The mix valve 274, 474, 574, 774, 874 varies the amount of flow that passes through the engine-fuel heat exchanger 279, 479, 579, 779, 879. If the coolant temperature is just hot enough to heat the fuel to the maximum allowable fuel temperature, the mix valve 274, 474, 574, 774, 874 will pass all of the fuel through the engine-fuel heat exchanger 279, 479, 579, 779, 879.

If the fuel coming from the second fuel tank 246, 446, 546, 746, 846 is already at the maximum allowable fuel temperature, then no fuel will pass through the engine-fuel heat exchanger 279, 479, 579, 779, 879. In some embodiments, the split may be somewhere between these two extremes.

The thermal-storage fuel system 24, 224, 324, 424, 524, 624, 724, 824 includes the aircraft fuel tanks 44, 46, 244, 246, 344, 346, 444, 446, 544, 546, 644, 646, 744, 746, 844, 846 where some of the heat loads in the coolant are rejected. The fuel tanks 44, 46, 244, 246, 344, 346, 444, 446, 544, 546, 644, 646, 744, 746, 844, 846 are divided into at least two functional tanks (each functional tank can be made up of multiple tanks). The second fuel tank 46, 246, 346, 446, 546, 646, 746, 846 may be very similar to fuel tanks typically used on aircraft 10.

However, the first fuel tank 44, 244, 344, 444, 544, 644, 744, 844 may be a dedicated fuel tank(s) configured to isolate a portion of the aircraft fuel. In doing so, this fuel may be heated to predetermined threshold temperature or maximum allowable tank temperature. This temperature may be higher than a maximum allowable tank temperature of the second fuel tank 46, 246, 346, 446, 546, 646, 746, 846 and the maximum allowable fuel temperature. In some embodiments, the maximum temperature in the first fuel tank 44, 244, 344, 444, 544, 644, 744, 844 may be limited to the highest temperature of the coolant in the cooling loop 20, 220, 320, 420, 520, 620, 720, 820.

However, if the coolant maximum temperature is too high, an upper limit may be put on the maximum allowable tank temperature of the first fuel tank 44, 244, 344, 444, 544, 644, 744, 844. Later in the mission, the fuel in the first fuel tank 44, 244, 344, 444, 544, 644, 744, 844 may be cooled to or below maximum allowable tank temperature of the first fuel tank 44, 244, 344, 444, 544, 644, 744, 844, so that the engine 14, 214, 314, 414, 514, 614, 714, 814, may safely receive the fuel. In some embodiments, a fuel pump may be used to pump fuel through the fuel-tank heat exchanger 48, 248, 348, 448, 548, 648, 748, 848.

In some embodiments, the heat loads may be low enough that the first fuel tank 44, 244, 344, 444, 544, 644, 744, 844 may not need to be heated higher than maximum allowable tank temperature of the second fuel tank 46, 246, 346, 446, 546, 646, 746, 846. In this case, the dedicated first fuel tank 44, 244, 344, 444, 544, 644, 744, 844 may not be needed such that only one fuel tank may be used.

In other embodiments, the fuel may be mixed between the second fuel tank 46, 246, 346, 446, 546, 646, 746, 846 and the first fuel tank 44, 244, 344, 444, 544, 644, 744, 844 until the second fuel tank 46, 246, 346, 446, 546, 646, 746, 846 reaches maximum allowable tank temperature of the second fuel tank 46, 246, 346, 446, 546, 646, 746, 846. In doing so the time before the first fuel tank 44, 244, 344, 444, 544, 644, 744, 844 reaches the maximum allowable tank temperature of the first fuel tank 44, 244, 344, 444, 544, 644, 744, 844, is extended. This allows the aircraft 10 to reach a higher altitude (and hence colder air) before all cooling is supplied by the air-stream heat exchanger 36, 236, 336, 436, 536, 636, 736, 836.

In the illustrative embodiment, the fuel-tank heat exchanger 48, 248, 348, 448, 548, 648, 748, 848 is located in the first fuel tank 44, 244, 344, 444, 544, 644, 744, 844. However, in other embodiments, the fuel-tank heat exchanger 48, 248, 348, 448, 548, 648, 748, 848 may be located in another suitable location to heat the fuel in the first fuel tank 44, 244, 344, 444, 544, 644, 744, 844.

The ram air cooler 22 includes a variable NACA inlet 33. The variable NACA inlet 33 will reduce the amount of drag created from the duct 34.

Furthermore, on very cold days when the fuel is very cold, it may be advantageous to minimize heat rejection via the ram air cooler 22, 222, 322, 422, 522, 622, 722, 822 to minimize drag and to dump the heat to the fuel. In this situation, the variable inlet 33 may be closed off, forcing the remaining coolant heat to be rejected to the first fuel tank 44, 244, 344, 444, 544, 644, 744, 844. Therefore, some of the waste heat may be retained in the engine cycle, improving system efficiency.

Unlike other ram air coolers, the blower and blower duct/door are removed from the ram air cooler 22, 222, 322, 422, 522, 622, 722, 822 of the present disclosure. This first fuel tank 44, 244, 344, 444, 544, 644, 744, 844 is instead used as thermal energy storage when at ground idle or when taxiing.

Because the air stream may not be needed until later in the mission, when at a higher altitude, the fan stream in an electric propulsor may be sufficiently cool to use as the air heat sink. If this is the case, a dedicated ram air duct may not be needed.

To help with understanding the operation of this system 12, 212, 312, 412, 512, 612, 712, 812, the different modes of operation through a mission will be described. The mission to be described is for a very hot day.

At ground idle, taxi, take-off, or start of climb, very little heat may be rejected through the air-stream heat exchanger 36, 236, 336, 436, 536, 636, 736, 836. As much heat as possible may be transferred to the fuel through the engine-fuel heat exchanger 279, 479, 579, 779, 879, most of the heat may be rejected through the fuel-tank heat exchanger 48, 248, 348, 448, 548, 648, 748, 848 and stored in the fuel in the first fuel tank 44, 244, 344, 444, 544, 644, 744, 844.

As the aircraft 10 climbs and increases in speed, the air in the atmosphere 18 may become colder and the pressure difference across the air-stream heat exchanger 36, 236, 336, 436, 536, 636, 736, 836 will increase. Therefore, even more heat form the coolant may be rejected through the air-stream heat exchanger 36, 236, 336, 436, 536, 636, 736, 836 and less heat will be rejected to the first fuel tank 44, 244, 344, 444, 544, 644, 744, 844. At some point, all the heat may be rejected from the engine-fuel unit 250, 350, 450, 550, 750, 850 and the ram air cooler 22, 222, 322, 422, 522, 622, 722, 822.

At the end of the climb, as the aircraft begins to cruise at higher altitudes, the coolant exiting the ram air cooler 22, 222, 322, 422, 522, 622, 722, 822 may have lost more heat than is being added to the coolant from the heat source 16, 216, 316, 416, 516, 616, 716, 816. At this point, the coolant from the air-stream heat exchanger 36, 236, 336, 436, 536, 636, 736, 836 flowing to the fuel-tank heat exchanger 48, 248, 348, 448, 548, 648, 748, 848 may begin to absorb heat from the fuel in the first fuel tank 44, 244, 344, 444, 544, 644, 744, 844.

During the cruise phase of the mission, the first fuel tank 44, 244, 344, 444, 544, 644, 744, 844 may be chilled below maximum allowable fuel temperature so that the fuel may be burned by the engine 14, 214, 314, 414, 514, 614, 714, 814. It may also be useful to significantly lower the fuel temperature to a very low temperature. In other words, the first fuel tank 44, 244, 344, 444, 544, 644, 744, 844 may be deeply cooled before landing.

As the aircraft 10 descends to lower altitudes, the air through the duct 34, 234, 334, 434, 534, 634, 734, 834 may begin to heat up again. During descent, heat source 16, 216, 316, 416, 516, 616, 716, 816 may be significantly less than during climb. However, a mission optimized ram air duct 34, 234, 334, 434, 534, 634, 734, 834 may not be able to provide all of the needed cooling during the full final portion of the mission.

As a result, the first fuel tank 44, 244, 344, 444, 544, 644, 744, 844 may be used as heat storage once again. At this point, there is only a portion of the earlier fuel remaining. This remaining fuel may be made up of fuel yet to be burned and fuel reserves. However, if the fuel had been previously deeply cooled to a low temperature, the limited fuel mass may still provide significant thermal storage because it is so cold relative to maximum allowable fuel temperature.

A variation on the mission profile may be for cold days. On cold days, the fuel may provide a very large thermal heat sink. In this case, one may close off the ram air cooler 22, 222, 322, 422, 522, 622, 722, 822 and reject more of the heat into the very cold fuel in the first fuel tank 44, 244, 344, 444, 544, 644, 744, 844. Furthermore, because the second fuel tank 46, 246, 346, 446, 546, 646, 746, 846 is so cold, rejecting heat into the second fuel tank 46, 246, 346, 446, 546, 646, 746, 846 may be advantageous. In this way, electrical energy losses may be returned to the fuel heat sink and minimize energy that may be dumped overboard. Furthermore, by avoiding use of the ram air cooler 22, 222, 322, 422, 522, 622, 722, 822 ram drag affects may be minimized.

In the illustrative embodiment of FIGS. 6 and 7, the system 412 includes batteries 428, which operate at relatively low temperatures. The illustrative embodiment, may add thermal lift capability to provide cooling capability at lower temperatures for the batteries 428.

In such illustrative embodiments, the coolant may be operated in two phases (i.e. liquid and vapor). The coolant may be a refrigerant that is chosen for optimal efficiency in the temperature operating range of the components being cooled and the heat sink that the heat is rejected to.

The thermal energy system 412 includes expansion valves 440, 441 and a compressor 442. The compressor 442 lowers the pressure downstream of the expansion valves 440, 441 indicated by arrows 494, 485. As the liquid refrigerant is expanded across the expansion valve 440, the refrigerant temperature is lowered and is able to keep the batteries 428 at a lower temperature than the other heat loads. As the refrigerant absorbs heat in the batteries 428, the coolant is vaporized and the compressor 442 then compresses the refrigerant to return it to the coolant to be cooled.

On cold days, thermal lift may not be needed, because the air temperature may be low enough to sufficiently cool the batteries 428, 528 using a two-phase pump loop, without thermal lift. In that case, the expansion valve 440 will have a lower pressure drop and will be used to control the flow rate to the batteries 428, 528. As the coolant is passed through the low temperature heat loads 428, the coolant may be partially or fully vaporized.

In the illustrative embodiment of FIG. 8, the resulting two-phase flow may then bypass the compressor 542 and be returned to the accumulator 538. This approach would likely use an orifice 531 just before the heat source 516 to increase the pump exit pressure in order to force flow through the batteries 528. The fluid flowing through the batteries 528 is then directed back to the accumulator 538 by the valve 560. In this mode of operation, the full system may be behaving as a TPPL.

Alternatively, the valve 560 may allow the fluid in line 596 to flow through line 598 to the compressor. The fluid may then flow through compressor 542 to eventually pass through line 583 to the engine-fuel heat exchanger 579.

The compressor 542 may have a bypass line to allow fluid to flow in this way if the compressor 542 is of a positive displacement design.

In the illustrative embodiments of FIGS. 6 and 7, the valves 454, 456, 458 controls the flow of the fluid to and from the fuel-tank heat exchanger 448. In some embodiments, the low temperature expanded refrigerant may be supplied to the fuel-tank heat exchanger 448 as show in FIG. 7. This may enable dropping the temperature of the fuel in the first fuel tank 444 to a temperature lower than the air temperature in the cooler 422. This may be useful on very hot day operations to drive the fuel temperature to a very low temperature in preparation for using it as a heat sink at the end of the mission.

The control system 26, 226, 426, 526, 626, 726, 826 is configured to control the flow of fluid in the cooling loop 20, 220, 420, 520, 620, 720, 820 to improve the overall performance of the aircraft 10. To do so, the first step may be to maintain acceptable operating temperatures on the devices being cooled. The second may be to minimize fuel burn over the entire mission.

In doing this, the controller 68, 268, 468, 568, 668, 768, 868 may chose when or how to reject the heat load 16, 216, 416, 516, 616, 716, 816 from the cooling loop 20, 220, 420, 520, 620, 720, 820. Hence, the controller 68, 268, 468, 568, 668, 768, 868 may be configured to put as much heat into the fuel tanks 44, 46, 244, 246, 344, 346, 444, 446, 544, 546, 644, 646, 744, 746, 844, 846 without ever encountering a situation where the devices are hotter than some upper predetermined threshold limit.

On a hot day, on a short duration flight, the use of the first fuel tank 44, 244, 344, 444, 544, 644, 744, 844 may be minimized so that during descent and/or taxiing, the first tank 44, 244, 344, 444, 544, 644, 744, 844 is cold enough to provide cooling.

However, on a longer flight, perhaps more heat may be added to the first tank 44, 244, 344, 444, 544, 644, 744, 844. During the long flight, the first tank 44, 244, 344, 444, 544, 644, 744, 844 may start being cooled with a higher initial temperature because there is sufficient time to cool the tank 44, 244, 344, 444, 544, 644, 744, 844 back down to the temperature required during descent and taxiing.

In the next extreme, on a cold day flight, the fuel tanks 44, 46, 244, 246, 344, 346, 444, 446, 544, 546, 644, 646, 744, 746, 844, 846 may be heated to minimize drag from the ram duct 34, 234, 334, 434, 534, 634, 734, 834 and to minimize waste heat from being dumped overboard of the aircraft 10. As such, the controller 68, 268, 468, 568, 668, 768, 868 may be configured to look at the mission profile and weather along the flight path to minimize fuel burn while still maintaining acceptable temperatures on the components.

In the illustrative embodiments, the sensors 62, 63, 64, 66, 67, 262, 263, 264, 266, 267, 462, 463, 464, 466, 467, 562, 563, 564, 566, 567, 662, 663, 664, 666, 667, 762, 763, 764, 766, 767, 862, 863, 864, 866, 867 are shown in respective locations to measure the temperature of the fuel or fluid in the system 12, 212, 312, 412, 512, 612, 712, 812. In other embodiments, the sensors 62, 63, 64, 66, 67, 262, 263, 264, 266, 267, 462, 463, 464, 466, 467, 562, 563, 564, 566, 567, 662, 663, 664, 666, 667, 762, 763, 764, 766, 767, 862, 863, 864, 866, 867 may be located along other points along the fluid conduit 30, 230, 430, 530, 630, 730, 830 that are suitable to measure the temperature of the fluid in the cooling loop 20, 220, 420, 520, 620, 720, 820. In other embodiments, the system 12, 212, 412, 512, 612, 712, 812 may include more sensors.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A thermal energy system for use with an aircraft, the thermal energy system comprising:
   a first heat source,
   a cooling loop having a fluid conduit, an accumulator in fluid communication with the fluid conduit, and a pump configured to move fluid from the accumulator through the fluid conduit to transfer heat from the first heat source to the fluid to cool the first heat source,
   a cooler that includes a duct configured to conduct air through the duct and an air-stream heat exchanger located in the duct and in thermal communication with the fluid in the cooling loop to transfer heat between the cooling loop and the air conducted through the duct,
   a thermal-storage fuel system that includes a first fuel tank configured to store fuel therein and a fuel-tank heat exchanger in thermal communication with the fluid and configured to transfer heat between the fluid in the cooling loop and the fuel stored in the first fuel tank, and
   a bypass valve connected to the fluid conduit upstream of the air-stream heat exchanger and configured to selectively cause at least a portion of a flow of the fluid in the cooling loop to bypass the air-stream heat exchanger and the fuel-tank heat exchanger and be delivered upstream of the accumulator.

2. The thermal energy system of claim 1, wherein the thermal-storage fuel system further includes a second fuel tank in fluid communication with the first fuel tank and the second fuel tank is configured to store fuel at a temperature that is different from a temperature of the fuel in the first fuel tank.

3. The thermal energy system of claim 2, wherein the thermal-storage fuel system further includes an engine-fuel unit configured to receive fuel from the second fuel tank and deliver the fuel to an engine, the engine-fuel unit including a valve system in fluid communication with the second fuel tank and an engine-fuel heat exchanger in fluid and thermal communication with the valve system and the cooling loop to transfer heat between the fluid in the cooling loop and the fuel from the second fuel tank, and wherein the valve system is configured to vary a flow of the fuel through the engine-fuel heat exchanger to deliver the fuel to the engine at an engine-fuel unit predetermined threshold temperature, and wherein the bypass valve is connected to the fluid conduit upstream of the engine-fuel unit and the bypass valve is configured to selectively cause at least a portion of a flow of the fluid in the cooling loop to bypass the engine-fuel heat exchanger.

4. The thermal energy system of claim 3, further comprising a second heat source configured to operate at a lower temperature than the first heat source during use of the thermal energy system, wherein the cooling loop further includes a compressor located downstream of the second heat source and a first expansion valve located upstream of the second heat source, and wherein the bypass valve is connected to the fluid conduit downstream of the compressor.

5. The thermal energy system of claim 4, further comprising a control system configured to selectively vary a flow of the fluid in the cooling loop through the air-stream heat exchanger and the fuel-tank heat exchanger to maintain a temperature of the first heat source below a predetermined heat load temperature.

6. The thermal energy system of claim 5, wherein the control system includes a sensor connected to the fluid conduit upstream of the accumulator and configured to measure a temperature of the fluid in the cooling loop as the fluid flows to the accumulator, and wherein the control system is configured to compare the measured temperature to a sensor target temperature and direct the bypass valve to selectively vary at least a portion of the flow of the fluid in the cooling loop to bypass the air-stream heat exchanger and the fuel-tank heat exchanger and enter the flow of the fluid in the cooling loop upstream of the sensor in response to the measured temperature being different from the sensor target temperature.

7. The thermal energy system of claim 1, further comprising a control system configured to selectively vary a flow of the fluid in the cooling loop through the air-stream heat exchanger and the fuel-tank heat exchanger to maintain a temperature of the first heat source below a predetermined heat load temperature.

8. The thermal energy system of claim 7, wherein the control system is configured to vary the predetermined heat load temperature throughout a flight cycle of the aircraft.

9. The thermal energy system of claim 7, wherein the control system is configured to allow the flow of the fluid in the cooling loop through the fuel-tank heat exchanger if a temperature of the fluid in the cooling loop is above the temperature of the fuel in the first fuel tank and the temperature of the fuel in the first fuel tank is less than a first fuel tank predetermined threshold temperature.

10. The thermal energy system of claim 9, wherein the control system is configured to allow the flow of the fluid in the cooling loop through the fuel-tank heat exchanger if the temperature of the fluid in the cooling loop is below the temperature of the fuel in the first fuel tank and the temperature of the fuel in the first fuel tank is greater than the first fuel tank predetermined threshold temperature.

11. The thermal energy system of claim 10, wherein the control system is configured to measure the heat transfer between the fluid and the fuel in the first fuel tank, compare the measured heat transfer to a predetermined heat rejection schedule, and selectively vary the flow of the fluid in the cooling loop through the fuel-tank heat exchanger in response to the measured heat transfer being different from the predetermined heat rejection schedule.

12. The thermal energy system of claim 1, further comprising a control system including a sensor connected to the fluid conduit upstream of the accumulator and configured to measure a temperature of the fluid in the cooling loop, and wherein the control system is configured to compare the measured temperature to a sensor target temperature and direct the bypass valve to selectively vary at least a portion of the flow of the fluid in the cooling loop to bypass the fuel-tank heat exchanger in response to the measured temperature being different from the sensor target temperature.

13. A method of operating the thermal energy storage system of claim 1, the method comprising:
conducting the fluid through the cooling loop to transfer heat between the first heat source and the fluid in the cooling loop,
conducting the fluid in the cooling loop to the air-stream heat exchanger to transfer heat between the fluid in the cooling loop and the air passing through the duct,
conducting the fluid in the cooling loop to the fuel-tank heat exchanger to transfer heat between the fluid in the cooling loop and the fuel stored in the first fuel tank, and
directing the bypass valve to selectively cause a portion of a flow of the fluid in the cooling loop to bypass the air-stream heat exchanger and the fuel-tank heat exchanger and be delivered upstream of the accumulator.

14. The method of claim 13, further comprising selectively varying the flow of the fluid in the cooling loop through the air-stream heat exchanger and a flow of the fluid through the fuel-tank heat exchanger to maintain a temperature of the first heat source below a predetermined heat load temperature.

15. The method of claim 13, further comprising measuring heat transfer between the fluid and the fuel in the first fuel tank, comparing the measured heat transfer to a predetermined heat rejection schedule, and selectively varying the flow of the fluid in the cooling loop through the fuel-tank heat exchanger in response to the measured heat transfer being different from the predetermined heat rejection schedule.

16. The method of claim 15, further comprising measuring the temperature of the fluid in the cooling loop upstream of the accumulator, comparing the measured temperature to a sensor target temperature, and selectively varying the flow of the fluid in the cooling loop through the air-stream heat exchanger and the fuel-tank heat exchanger in response to the measured temperature being different from the sensor target temperature.

17. The method of claim 13, further comprising conducting the fluid through the cooling loop to transfer heat between a second heat source and the fluid in the cooling loop, wherein the second heat source is configured to operate at a lower temperature than the first heat source during use of the thermal energy system, wherein the cooling loop further includes a compressor located downstream of the second heat source and a first expansion valve located upstream of the second heat source, and wherein the bypass valve is connected to the fluid conduit downstream of the compressor.

18. A thermal energy system for use with an aircraft, the thermal energy system comprising:
   a first heat source,
   a cooling loop having a fluid conduit, an accumulator in fluid communication with the fluid conduit, and a pump configured to move fluid from the accumulator through the fluid conduit to transfer heat from the first heat source to the fluid to cool the first heat source,
   a cooler that includes a duct configured to conduct air through the duct and an air-stream heat exchanger located in the duct and in thermal communication with the fluid in the cooling loop to transfer heat between the cooling loop and the air conducted through the duct,
   a thermal-storage fuel system that includes a first fuel tank configured to store fuel therein and a fuel-tank heat exchanger in thermal communication with the fluid and configured to transfer heat between the fluid in the cooling loop and the fuel stored in the first fuel tank,
   a bypass valve connected to the fluid conduit upstream of the air-stream heat exchanger and configured to selectively cause at least a portion of a flow of the fluid in the cooling loop to bypass the fuel-tank heat exchanger and be delivered upstream of the accumulator, and
   a second heat source configured to operate at a lower temperature than the first heat source during use of the thermal energy system,
   wherein the cooling loop further includes a compressor located downstream of the second heat source and a first expansion valve located upstream of the second heat source, and wherein the bypass valve is connected to the fluid conduit downstream of the compressor.

19. The thermal energy system of claim 18, further comprising a control system configured to selectively vary a flow of the fluid in the cooling loop through the air-stream heat exchanger and the fuel-tank heat exchanger to maintain a temperature of the first and second heat sources below a predetermined heat load temperature.

20. The thermal energy system of claim 19, wherein the control system includes a sensor connected to the fluid conduit upstream of the accumulator and configured to measure a temperature of the fluid in the cooling loop as the fluid flows to the accumulator.

* * * * *